(12) United States Patent
Sudheendra et al.

(10) Patent No.: US 9,922,439 B2
(45) Date of Patent: Mar. 20, 2018

(54) DISPLAYING METHOD, ANIMATION IMAGE GENERATING METHOD, AND ELECTRONIC DEVICE CONFIGURED TO EXECUTE THE SAME

(71) Applicant: SAMSUNG ELECTRONICS CO., LTD., Suwon-si (KR)

(72) Inventors: Pavan Sudheendra, Bangalore (IN); Sarvesh, Bangalore (IN); Yogesh Manav, Bangalore (IN); Adappa M Gourannavar, Bangalore (IN); Rahul Varna, Bangalore (IN); Sumanta Baruah, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/809,571

(22) Filed: Jul. 27, 2015

(65) Prior Publication Data
US 2016/0027202 A1   Jan. 28, 2016

(30) Foreign Application Priority Data

Jul. 25, 2014  (IN) .......................... 3653/CHE/2014
May 14, 2015  (IN) .......................... 3653/CHE/2014
Jul. 1, 2015  (KR) ....................... 10-2015-0094368

(51) Int. Cl.
*G06T 13/80* (2011.01)
*G06F 3/041* (2006.01)
(Continued)

(52) U.S. Cl.
CPC ............ *G06T 13/80* (2013.01); *G06F 1/1643* (2013.01); *G06F 1/1686* (2013.01); *G06F 1/1694* (2013.01); *G06F 3/041* (2013.01); *G06F 3/0488* (2013.01); *G06F 3/167* (2013.01); *G06T 7/20* (2013.01)

(58) Field of Classification Search
USPC .................................................. 345/419, 473
See application file for complete search history.

(56) References Cited

U.S. PATENT DOCUMENTS

| 8,166,422 B2 * | 4/2012 | Rao .................... | H04M 1/72544 711/171 |
| 9,344,608 B2 * | 5/2016 | Ferens .................. | H04N 5/2226 |

(Continued)

FOREIGN PATENT DOCUMENTS

| KR | 10-2010-0085328 A | 7/2010 |
| WO | 2013/079774 A1 | 6/2013 |
| WO | 2013/175051 A1 | 11/2013 |

OTHER PUBLICATIONS

Communication dated Oct. 29, 2015 issued by the International Searching Authority in counterpart International Application No. PCT/KR2015/007691 (PCT/ISA/210/237).

(Continued)

*Primary Examiner* — Kimbinh T Nguyen
(74) *Attorney, Agent, or Firm* — Sughrue Mion, PLLC

(57) ABSTRACT

A method for of playing an animation image, the method including: obtaining a plurality of images; displaying a first image of the plurality of images; detecting a first event as a trigger to play the animation image for a first object of the first image; and playing the animation image for the first object using the plurality of images.

20 Claims, 31 Drawing Sheets

(51) Int. Cl.
  *G06F 3/16* (2006.01)
  *G06T 7/20* (2017.01)
  *G06F 3/0488* (2013.01)
  *G06F 1/16* (2006.01)

(56) References Cited

U.S. PATENT DOCUMENTS

| | | | |
|---|---|---|---|
| 2009/0064012 A1* | 3/2009 | Tremblay | G06F 3/0481 715/764 |
| 2009/0201297 A1* | 8/2009 | Johansson | G06T 13/40 345/473 |
| 2010/0073382 A1* | 3/2010 | Rao | G06F 17/30905 345/473 |
| 2010/0182324 A1 | 7/2010 | Ko et al. | |
| 2011/0007078 A1* | 1/2011 | Cao | G06F 3/04845 345/473 |
| 2011/0164042 A1* | 7/2011 | Chaudhri | G06F 3/0481 345/473 |
| 2011/0316859 A1 | 12/2011 | Nikula et al. | |
| 2012/0038625 A1* | 2/2012 | Kim | G06F 3/04815 345/419 |
| 2012/0306890 A1* | 12/2012 | Shaffer | G06T 13/00 345/473 |
| 2012/0306891 A1* | 12/2012 | Shaffer | G06T 13/00 345/473 |
| 2013/0154963 A1 | 6/2013 | Wang | |
| 2013/0169560 A1 | 7/2013 | Cederlund et al. | |
| 2013/0212470 A1* | 8/2013 | Karunamuni | G06F 17/24 715/243 |
| 2013/0287257 A1 | 10/2013 | Dedhia et al. | |
| 2013/0297319 A1 | 11/2013 | Kim | |
| 2014/0086476 A1 | 3/2014 | Ferens | |
| 2014/0168255 A1* | 6/2014 | Rydenhag | G06T 11/60 345/619 |
| 2015/0309581 A1* | 10/2015 | Minnen | G06T 7/20 345/156 |

OTHER PUBLICATIONS

Communication dated Dec. 15, 2017, issued by the European Patent Office in counterpart European Application No. 15824442.6.

* cited by examiner

DISPLAYING METHOD, ANIMATION IMAGE GENERATING METHOD, AND ELECTRONIC DEVICE CONFIGURED TO EXECUTE THE SAME

CROSS-REFERENCE TO RELATED APPLICATION(S)

This application claims priority from Provisional Indian Patent Application No. IN 3653/CHE/2014 filed on Jul. 25, 2014, in the Indian Patent Office, Indian Patent Application No. IN 3653/CHE/2014 filed on May 14, 2015, in the Indian Patent Office, and Korean Patent Application No. 10-2015-0094368 filed on Jul. 1, 2015, in the Korean Intellectual Property Office, the disclosures of which are incorporated herein by reference in their entireties.

TECHNICAL FIELD

Aspects of one or more exemplary embodiments relate to electronic devices for displaying images and methods for controlling the same, and, more specifically, to electronic devices for displaying animation images and methods for controlling the same.

BACKGROUND

There is a demand for image capturing/displaying-enabled electronic devices, including small image capturing/displaying-enabled electronic devices such as smartphones, tablet personal computers (PCs), and digital cameras. Conventional electronic devices may capture and store images or may display the stored images at a user's request. A conventional electronic device may communicate with another electronic device to receive images from the other electronic device and may display the received images at a user's request.

Related art electronic devices in the related art may capture and display animation images. An animation image may include multiple images captured over time. Related art electronic devices may display the animation image by quickly switching the multiple images, so that the images appear to be animated. A related art electronic device may store animation images, transmit the stored animation images to another electronic device or receive stored animation images from the other electronic device. Accordingly, an animation image captured by a first user may be viewed by a second user through the second user's electronic device.

Related art electronic devices may capture and display animation images. However, such electronic devices may simply display a plurality of captured images in sequence. In other words, the related art electronic devices are provided merely with methods for displaying an animation image in which the whole image is changed. In other words, there is no disclosure of displaying an animation in which only part of an image is changed.

The above information is presented as background information only to assist with an understanding of one or more exemplary embodiments. No determination has been made, and no assertion is made, as to whether any of the above might be applicable as prior art with regard to the present disclosure.

SUMMARY

Aspects of one or more exemplary embodiments have been conceived to address the above issues. An aspect of various embodiments is to provide an electronic device that, when a particular object is designated, plays an animation image corresponding to the object, and a method for controlling the same.

In accordance with aspects of various exemplary embodiments, there is provided a method for of playing an animation image including: obtaining a plurality of images; displaying a first image of the plurality of images; detecting a first event as a trigger to play the animation image for a first object of the first image; and playing the animation image for the first object using the plurality of images.

The method may further include maintaining a still display of objects within the first image other than the first object.

The method may further include segmenting the first object in each of the plurality of images.

The segmenting the first object in each of the plurality of images may include: obtaining a respective depth map for each of the plurality of images; and segmenting the first object in each of the plurality of images based on the respective depth maps.

The segmenting the first object in each of the plurality of images may include: obtaining respective image information for each of the plurality of images; and segmenting the first object in each of the plurality of images based on the respective image information.

The detecting the first event may include detecting a touch on an area corresponding to the first object of the displayed first image or detecting a user's view correspond to the area corresponding to the first object of the displayed first image.

The detecting the first event may include detecting an object of the first image having a movement exceeding a threshold of the first image.

The detecting the first event may include detecting at least one of a sound as the first event, motion information as the first event, and an image analysis result as the first event.

The method may further include: correcting a hidden area of the plurality of images; and playing the animation image for the first object using the plurality of corrected images.

The method may further include: obtaining a sound while obtaining the plurality of images; and outputting the obtained sound while playing the animation image.

In accordance with aspects of various exemplary embodiments, there is provided an electronic device including: electronic device, including: a display; a processor electrically connected to the display; and a memory electrically connected to the processor, wherein the memory stores an instruction that, when executed by the processor, instructs the processor to: obtain a plurality of images, control the display to display a first image of the plurality of images, detect a first event as a trigger to play an animation image for a first object of the first image, and control the display to play the animation image for the first object using the plurality of images.

The memory may further store an instruction that, when executed by the processor, instructs the processor to maintain the display of objects within the first image other than the first object.

The memory may further store an instruction that, when executed by the processor, instructs the processor to perform segmentation on the first object in each of the plurality of images.

The memory may further store an instruction that, when executed by the processor, instructs the processor to: obtain a respective depth map for each of the plurality of images, and perform segmentation on the first object in each of the plurality of images based on the respective depth maps.

The memory may further store an instruction that, when executed by the processor, instructs the processor to: obtain respective image information for each of the plurality of images, and perform segmentation on the first object in each of the plurality of images based on the respective the image information.

The memory may further store an instruction that, when executed by the processor, instructs the processor to detect the first event by detecting at least one of a touch on an area corresponding to the first object of the displayed first image, and a user's view on the area corresponding to the first object of the displayed first image.

The memory may further store an instruction that, when executed by the processor, instructs the processor to detect the first event by detecting an object of the first image having a movement exceeding a threshold of the first image.

The memory may further store an instruction that, when executed by the processor, instructs the processor to detect the first event by detecting at least one of a sound as the first event, motion information as the first event, and an image analysis result as the first event.

The memory may further store an instruction that, when executed by the processor, instructs the processor to: correct a hidden area of the plurality of images, and control the display to play the image animation for the first object using the plurality of corrected images.

The memory may further store an instruction that, when executed by the processor, instructs the processor to: obtain a sound while obtaining the plurality of images, and output the obtained sound while playing the animation image In accordance with aspects of various exemplary embodiments, there is provided a method of generating an animation image, the method including: obtaining a plurality of images; generating the animation image corresponding to a first object of a first image of the plurality of images based on the plurality of images; obtaining a first event to be a trigger to play the animation image; and storing the first event in association with the animation image.

The obtaining the first event may include obtaining the first event using at least one of the plurality of images.

The obtaining the first event may include obtaining the first event based on a detected input.

The method may further include: obtaining a sound; and storing the obtained sound in association with the animation image.

The method may further include: obtaining information for segmenting at least one of the plurality of images; and storing the information for the segmenting in association with the animation image In accordance with aspects of various exemplary embodiments, there is provided an electronic device including: a processor; and a memory electrically connected to the processor, wherein the memory stores an instruction that, when executed by the processor, instructs the processor to: obtain a plurality of images, generate an animation image corresponding to a first object of a first image of the plurality of images based on the plurality of images, obtain a first event to be a trigger to play the animation image, and store the first event in association with the animation image.

The memory may further store an instruction that, when executed by the processor, instructs the processor to obtain the first event using at least one of the plurality of images.

The memory may further store an instruction that, when executed by the processor, instructs the processor to obtain the first event based on a detected input.

The memory may further store an instruction that, when executed by the processor, instructs the processor to store a sound obtained from around the electronic device in association with the animation image.

The memory may further store an instruction that, when executed by the processor, instructs the processor to: obtain information for segmenting at least one of the plurality of images, and store the information for the segmenting in association with the animation image.

According to aspects of one or more exemplary embodiments, there is provided an electronic device that plays an animation image for some object of an image and a method for controlling the same. Further, there may be provided an electronic device that plays an animation for an object corresponding to a detected event, with an event set for each of objects of an animation image and a method for controlling the same.

According to aspects of one or more exemplary embodiments, there is provided an electronic device including: a processor; and a memory having stored thereon a program that, when executed by the processor, controls the processor to: obtain a plurality of images; detect a first object of a first image of the plurality of images; detect a change in the first object between the first image and a second image of the plurality of images; and generate an animation image corresponding to the first object based on the change in the first object between the first image and the second image, wherein the animation image is configured to be played by displaying objects of the first image other than the first object as still, and animating the change of the first object.

The program, when executed by the processor, may further control the processor to: detect an area in the first image occluded by the first object in the first image; correct the occluded area using the plurality of images; and generate the animation image using the corrected occluded area.

The program, when executed by the processor, may further control the processor to: detect an irregular camera movement among the plurality of images; correct the irregular camera movement; and generate the animation image using the corrected irregular camera movement.

Other aspects, advantages, and salient features of one or more exemplary embodiments will become apparent to those of ordinary skilled in the art from the following detailed description, which, taken in conjunction with the annexed drawings, discloses certain exemplary embodiments.

BRIEF DESCRIPTION OF THE DRAWINGS

A more complete appreciation of one or more exemplary embodiments and many of the attendant aspects thereof will be readily obtained and better understood by reference to the following detailed description considered in connection with the accompanying drawings, wherein.

Throughout the drawings, like reference numerals will be understood to refer to like parts, components, and structures.

DETAILED DESCRIPTION

Figure 1:
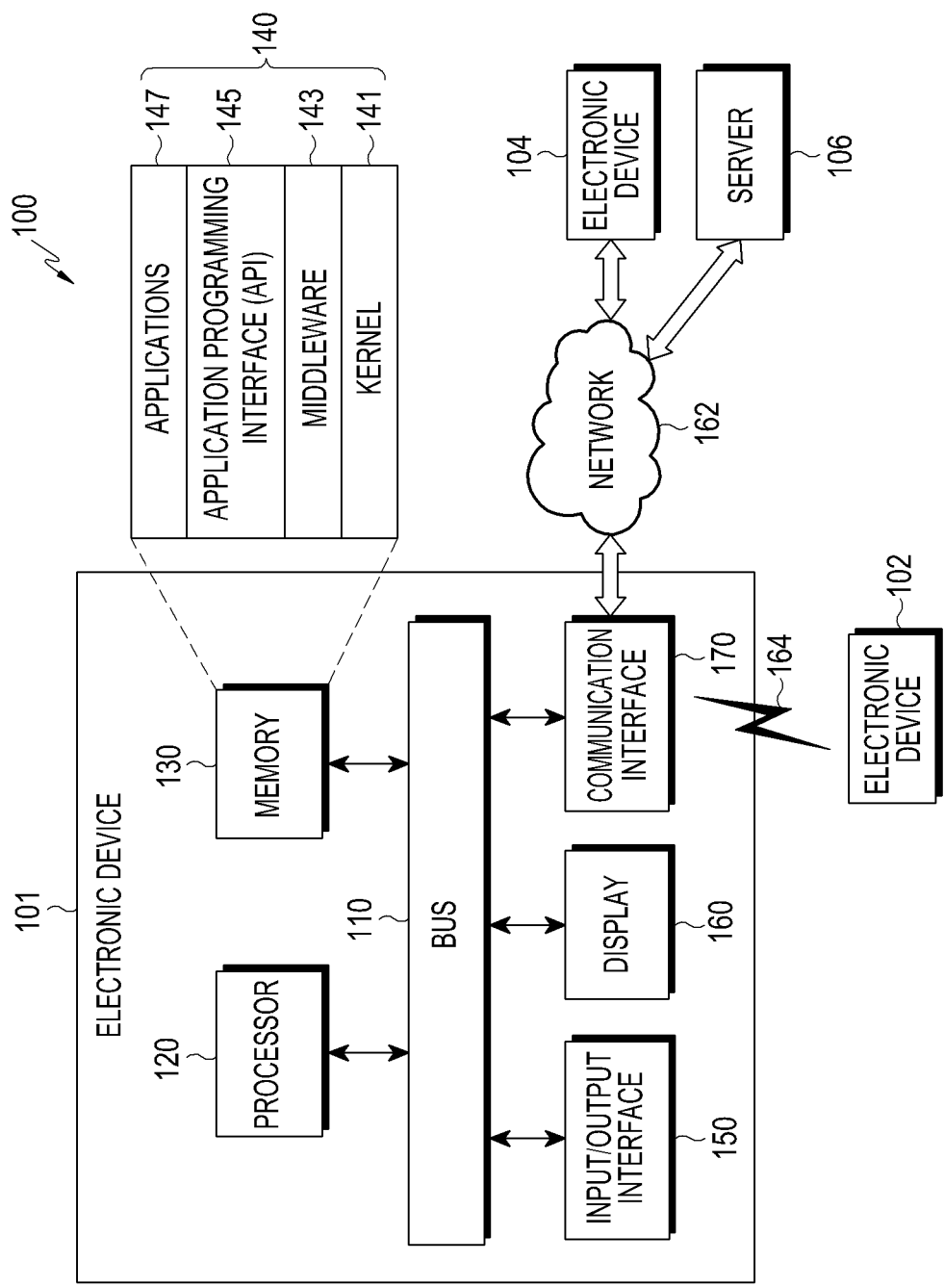
FIG. 1 is a block diagram of an electronic device and a network according to an exemplary embodiment.

Hereinafter, certain exemplary embodiments will be described with reference to the accompanying drawings. However, it should be appreciated that one or more exemplary embodiments are not limited to the certain exemplary embodiments described herein, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order, and are used to distinguish one component from another without limiting the components. For example, a first user device and a second user device may indicate different user devices, regardless of the order or importance of the devices. For example, a first component may be referred to as a second component, and vice versa.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured to" may mean that a device can perform an operation together with another device or parts. For example, the phrase "processor configured (or set) to perform A, B, and C" may mean a general-purpose processor (e.g., a central processing unit (CPU) or application processor) that may perform the operations by executing one or more software programs stored in a memory device or a dedicated processor (e.g., an embedded processor) for performing the operations.

The terms as used herein are provided merely to describe certain exemplary embodiments, and, therefore, should not be construed as limiting the scope of other exemplary embodiments. It is to be understood that the singular forms "a," "an," and "the" include plural references unless the context clearly dictates otherwise. Technical and scientific terms used herein have the same meaning as commonly understood by one of ordinary skill in the art to which the exemplary embodiments belong unless otherwise indicated. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Non-limiting examples of the electronic device according to one or more exemplary embodiments may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device. According to one or more exemplary embodiments, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

According to one or more exemplary embodiments, the electronic device may be a home appliance. Non-limiting examples of a home appliance may include at least one of a television (TV), a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™) an electronic dictionary, an electronic key, a camcorder, or an electronic picture frame.

According to an one or more exemplary embodiments, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, automatic teller machines (ATMs), point of sale (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to various exemplary embodiments, examples of the electronic device may include at least one of furniture, part of a building/structure, an electronic board, an electronic signature receiving device, a projector, or various measurement devices (e.g., devices for measuring water, electricity, gas, or electromagnetic waves). According to one or more exemplary embodiments, the electronic device may be one or a combination of the above-listed devices. According to one or more exemplary embodiments, the electronic device may be a flexible electronic device. The electronic device disclosed herein is not limited to the above-listed devices, and may include other electronic devices including new electronic devices developed through technological advancement.

Hereinafter, electronic devices are described with reference to the accompanying drawings, according to various exemplary embodiments. As used herein, the term "user" may denote a human or another device (e.g., an artificial intelligent electronic device) using the electronic device.

Referring to FIG. 1, according to an exemplary embodiment, an electronic device 101 is included in a network environment 100. The electronic device 101 may include a bus 110, a processor 120, a memory 130, an input/output interface 150, a display 160, and a communication interface 170, e.g., a communicator or a communication module. In some exemplary embodiments, the electronic device 101 may exclude one or more of the above components, or may include additional component.

The bus 110 may include a circuit for connecting the components 110 to 170 with one another and transferring communications (e.g., control messages and/or data) between the components 120-170.

The processing module 120 may include one or more of a central processing unit (CPU), an application processor (AP), or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an exemplary embodiment, the memory 130 may store software and/or a program 140. The program 140 may include, e.g., a kernel 141, middleware 143, an application programming interface (API) 145, and/or an application (or "application program") 147. At least a portion of the kernel 141, middleware 143, or API 145 may be denoted as an operating system (OS).

For example, the kernel 141 may control or manage system resources (e.g., the bus 110, processor 120, or memory 130) used to perform operations or functions implemented in other programs (e.g., the middleware 143, API 145, or application 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141.

Further, the middleware 143 may process one or more task requests received from the application 147 in order of priority. For example, the middleware 143 may assign priority to at least one of the applications 147 to use system resources (e.g., the bus 110, processor 120, or memory 130) of at least one electronic device 101. For example, the middleware 143 may perform scheduling or load balancing on the one or more task requests by processing the one or more task requests according to the priority assigned to the at least one application 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, for example, transfer commands or data input from a user or other external devices to other component(s) of the electronic device 101. Further, the input/output interface 150 may output commands or data received from one or more other components of the electronic device 101 to the user or the other external device.

The display 160 may include, e.g., a liquid crystal display (LCD), a light emitting diode (LED) display, an organic light emitting diode (OLED) display, a microelectromechanical systems (MEMS) display, or an electronic paper display. The display 160 may display, e.g., various contents (e.g., text, images, videos, icons, or symbols). The display 160 may include a touchscreen and may receive, e.g., a touch, gesture, proximity or hovering input using an electronic pen or a body portion of the user.

The communication interface 170 may set up communication between the electronic device 101 and an external device (e.g., a first electronic device 102, a second electronic device 104, or a server 106). For example, the communication interface 170 may be connected with the network 162, through wireless or wired communication, to communicate with the external electronic device (e.g., the second external electronic device 104 or server 106).

The wireless communication may be a cellular communication protocol and may use at least one of Long-Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM). Further, the wireless communication may include short-range communication 164. The short-range communication 164 may include at least one of Wireless Fidelity (Wi-Fi), Bluetooth, Near-Field Communication (NFC), or Global Navigation Satellite System (GNSS). The GNSS may include at least one of Global Positioning System (GPS), Global Navigation Satellite System (Glonass), Beidou Navigation Satellite System (hereinafter, "Beidou"), Galileo, or the European global satellite-based navigation system. Hereinafter, the terms "GPS" and the "GNSS" may be interchangeably used herein. The wired connection may include at least one of Universal Serial Bus (USB), High Definition Multimedia Interface (HDMI), Recommended Standard (RS)-232, or Plain Old Telephone Service (POTS). The network 162 may include at least one of telecommunication networks, e.g., a computer network (e.g., LAN or WAN), Internet, or a telephone network.

The first and second external electronic devices 102 and 104 each may be a device of the same or a different type from the electronic device 101. The server 106 may include a group of one or more servers. All or some of operations executed on the electronic device 101 may be executed on another or multiple other electronic devices (e.g., the electronic devices 102 and 104 or server 106). According to an exemplary embodiment, when the electronic device 101 should perform some function or service, the electronic device 101, instead of executing the function or service, may request another device (e.g., electronic devices 102 and 104 or server 106) perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by providing the received result, or further processing the received result. To that end, a cloud computing, distributed computing, or client-server computing technique may be used, as non-limiting examples.

According to an exemplary embodiment, the processor 120 may be electrically connected to the display 160. Further, the processor 120 may be electrically connected to the memory 130. The memory 130 may store instructions executed to enable the processor 120 to obtain a plurality of images, to display a first image of the plurality of images on the display 160, and to detect a first event configured to start to play an animation image on a first object of the first image, and to control the display 160 to play an animation on the first object using the plurality of images.

According to an exemplary embodiment, the memory 130 may store an instruction that, when executed, controls the processor 120 to maintain the display of other objects than the first object in the first image.

According to an exemplary embodiment, the memory 130 may store an instruction that, when executed, enables the processor 120 to segment the first object in each of the plurality of images.

According to an exemplary embodiment, the memory 130 may store an instruction that, when executed, enables the processor 120 to obtain a depth map for each of the plurality of images and to segment the first object in each of the plurality of images based on the depth map for each of the plurality of images.

According to an exemplary embodiment, the memory 130 may store an instruction that, when executed, enables the processor 120 to obtain image information for each of the plurality of images and to segment the first object in each of the plurality of images based on the image information for each of the plurality of images.

According to an exemplary embodiment, the memory 130 may store an instruction that, when executed, enables the processor 120 to detect a touch on an area corresponding to the first object of the displayed animation image or to detect a user's view for the area corresponding to the first object of the displayed animation image.

According to an exemplary embodiment, the memory 130 may store an instruction that, when executed, enables the processor 120 to detect an object having a motion exceeding a threshold of the first image.

According to an exemplary embodiment, the memory 130 may store an instruction that, when executed, enables the processor 120 to detect at least one of a sound set to the first event, a motion information set to the first event, and an image analysis result set to the first event.

According to an exemplary embodiment, the memory 130 may store an instruction that, when executed, enables the processor 120 to correct a hidden area of the plurality of images and to control the display 160 to play the animation for the first object using the plurality of corrected images.

According to an exemplary embodiment, the memory 130 may store an instruction that, when executed, enables the processor 120 to obtain a sound while obtaining a plurality of images and to output the obtained sound while the animation for the first object is played.

According to an exemplary embodiment, the memory 130 may store instructions that, when executed, enables the processor 120 to obtain a plurality of images, to generate an animation image corresponding to a first object of a first image of the plurality of images based on the plurality of images, to obtain a first event for playing an animation image corresponding to the first object, and to store the first event in association with the animation image.

According to an exemplary embodiment, the memory 130 may store an instruction that, when executed, enables the processor 120 to obtain the first event using at least one of the plurality of images.

According to an exemplary embodiment, the memory 130 may store an instruction that, when executed, enables the processor 120 to obtain the first event based on a detected input.

The memory 130 may store an instruction that, when executed, enables the processor 120 to store a sound obtained from around the electronic device in association with the animation image.

The memory 130 may store an instruction that, when executed, enables the processor 120 to obtain information for segmenting at least one of the plurality of images and to store the information for the segmentation in association with the animation image.

Figure 2:
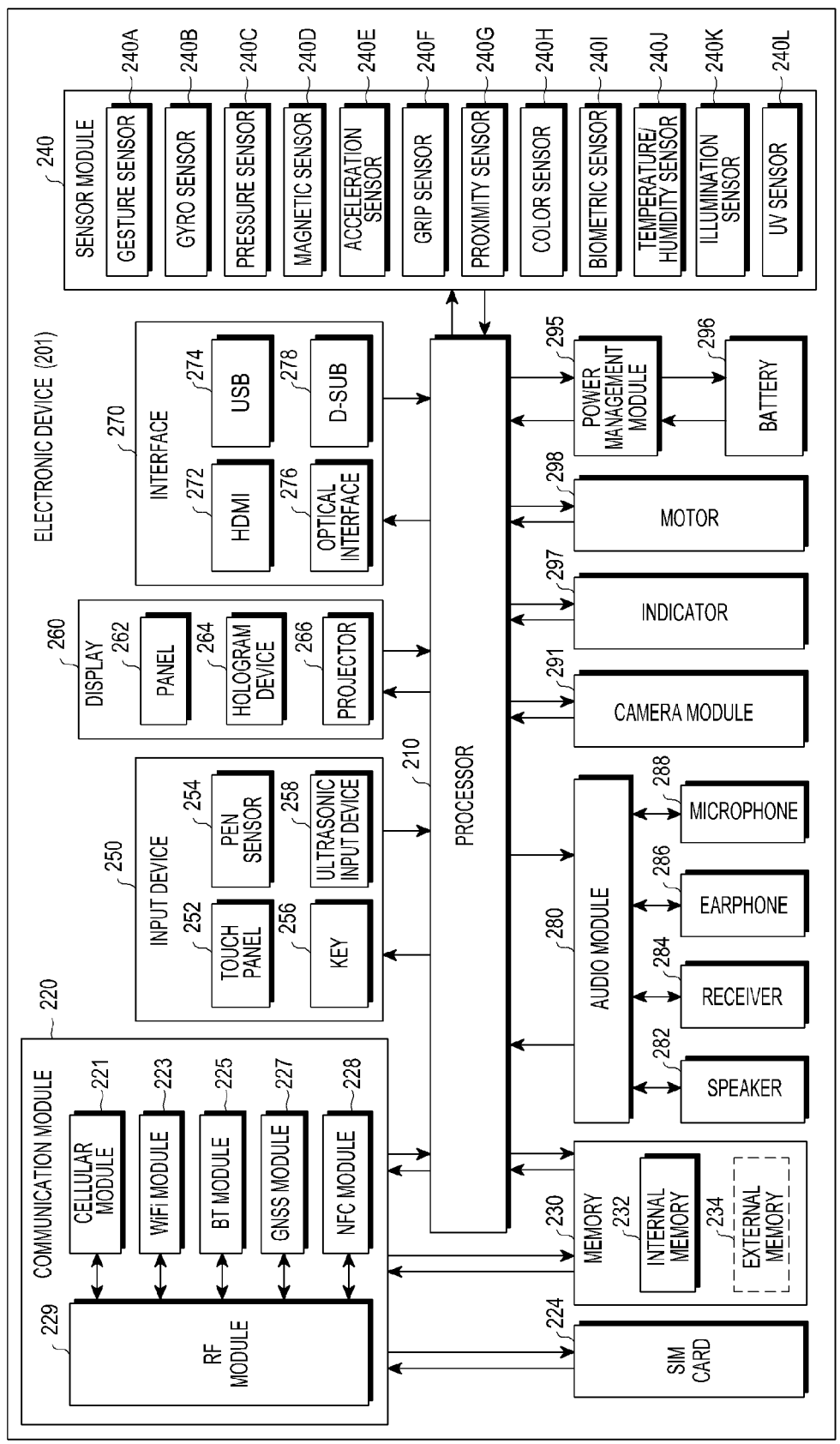
FIG. 2 is a block diagram of an electronic device according to an exemplary embodiment.

FIG. 2 is a block diagram of an electronic device 201 according to an exemplary embodiment. The electronic device 201 may include the whole or part of the configuration of the electronic device 101 shown in FIG. 1. The electronic device 201 may include one or more processors 210 (e.g., application processors (APs)) 210, a communication module 220, a subscriber identification module (SIM) 224, a memory 230, a sensor module 240, an input device 250, e.g., an input unit or an input module, a display 260, an interface 270, an audio module 280, a camera module 291, a power management module 295, a battery 296, an indicator 297, and a motor 298.

The processor 210 may control multiple hardware and software components connected to the processor 210 by running, for example, an operating system or application programs, and the processor 210 may process and compute various data. The processor 210 may be implemented in a System on Chip (SoC). According to an exemplary embodiment, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store various data in the non-volatile memory.

The communication module 220 may have the same or similar configuration to the communication interface 170 of FIG. 1. The communication module 220 may include, for example, a cellular module 221, a Wi-Fi module 223, a Bluetooth module 225, a GNSS module 227 (e.g., a GPS module, a Glonass module, a Beidou module, or a Galileo module), an NFC module 228, and a radio frequency (RF) module 229.

The cellular module 221 may provide voice call, video call, text, or Internet services through a communication network. The cellular module 221 may perform identification or authentication on the electronic device 201 in the communication network using the SIM 224 (e.g., a SIM card). According to an exemplary embodiment, the cellular module 221 may perform at least some of the functions of the processor 210. According to an exemplary embodiment, the cellular module 221 may include a communication processor (CP).

The Wi-Fi module 223, the Bluetooth module 225, the GNSS module 227, or the NFC module 228 may include a process for processing data communicated through the module. Two or more of the cellular module 221, the Wi-Fi module 223, the Bluetooth module 225, the GNSS module 227, or the NFC module 228 may be included in a single integrated circuit (IC) or an IC package.

The RF module 229 may transmit and receive data, e.g., communication signals or RF signals. The RF module 229 may include, for example, a transceiver, a power amp module (PAM), a frequency filter, an LNA (low noise amplifier), or an antenna. According to an exemplary embodiment, at least one of the cellular module 221, the Wi-Fi module 223, the Bluetooth module 225, the GNSS module 227, and the NFC module 228 may communicate RF signals through a separate RF module.

The SIM 224 may include a card including a subscriber identification module and/or an embedded SIM, and may contain unique identification information (e.g., an integrated circuit card identifier (ICCID) or subscriber information (e.g., an international mobile subscriber identity (IMSI)).

The memory 230 may include an internal memory 232 or an external memory 234. The internal memory 232 may include at least one of a volatile memory (e.g., a dynamic RAM (DRAM), a static RAM (SRAM), a synchronous dynamic RAM (SDRAM), etc.) or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or a solid state drive (SSD).

The external memory 234 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 234 may be functionally and/or physically connected with the electronic device 201 via various interfaces.

The sensor module 240 may measure a physical quantity or detect an operational state of the electronic device 201, and the sensor module 240 may convert the measured quantity or detected information into an electrical signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H, e.g., an Red-Green-Blue (RGB) sensor, a biometric sensor 240I, a temperature/humidity sensor 240J, an illumination sensor 240K, and an Ultra Violet (UV) sensor 240L. Additionally or alternatively, the sensing module 240 may include an E-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling one or more of the sensors included in the sensing module. According to an exemplary embodiment, the electronic device 201 may further include a processor configured to control the sensor module 240 as part of the processor 210 or separately from the processor 210, and the electronic device 201 may control the sensor module 240 while the processor 210 is in a sleep mode.

The input device 250 may include a touch panel 252, a (digital) pen sensor 254, a key 256, or an ultrasonic input device 258. The touch panel 252 may use at least one of capacitive, resistive, infrared, or ultrasonic methods. The touch panel 252 may include a control circuit. The touch panel 252 may further include a tactile layer and may provide a user with a tactile reaction.

The (digital) pen sensor 254 may include a part of a touch panel or a separate sheet for recognition. The key 256 may include a physical button, an optical key, or a key pad. The ultrasonic input device 258 may sense an ultrasonic wave generated from an input tool through a microphone (e.g., the microphone 288) to identify data corresponding to the sensed ultrasonic wave.

The display 260 may include a panel 262, a hologram device 264, or a projector 266. The panel 262 may have the same or similar configuration to the display 160 of FIG. 1. The panel 262 may be implemented to be flexible, transparent, or wearable. The panel 262 may also be incorporated with the touch panel 252 in a module. The hologram device 264 may make three dimensional (3D) images (holograms) in the air by using light interference. The projector 266 may display an image by projecting light onto a screen. The screen may be located inside or outside of the electronic device 201. In accordance with an embodiment, the display 260 may further include a control circuit to control the panel 262, the hologram device 264, or the projector 266.

The interface 270 may include a High Definition Multimedia Interface (HDMI) interface 272, a USB interface 274, an optical interface 276, or a D-subminiature (D-sub) interface 278. The interface 270 may be included in the communication interface 170 shown in FIG. 1. Additionally or alternatively, the interface 270 may include a Mobile High-definition Link (MHL) interface, a secure digital (SD) card/multimedia card (MMC) interface, or an IrDA standard interface.

The audio module 280 may convert a sound into an electric signal or vice versa. At least a part of the audio module 280 may be included in the input/output interface 150 shown in FIG. 1. The audio module 280 may process sound information input or output through a speaker 282, a receiver 284, an earphone 286, or a microphone 288.

The camera module 291 may be a device for capturing still images and videos, and may include one or more image sensors (e.g., front and back sensors), a lens, an Image Signal Processor (ISP), or a flash such as an LED or xenon lamp.

The power manager module 295 may manage power of the electronic device 201. According to an exemplary embodiment, the power manager module 295 may include a power management Integrated circuit (PMIC), a charger IC, or a battery or fuel gauge. The PMIC may have a wired and/or wireless recharging scheme. The wireless charging scheme may include, for example, a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, and a voltage, a current, or a temperature while the battery 296 is being charged. The battery 296 may include, for example, a rechargeable battery or a solar battery.

The indicator 297 may indicate a particular state of the electronic device 201 or a part (e.g., the processor 210) of the electronic device, such as, as non-limiting examples, a booting state, a message state, or a recharging state. The motor 298 may convert an electric signal to a mechanical vibration and may generate a vibrational or haptic effect.

A processing unit for supporting mobile TV, such as a GPU, may be included in the electronic device 201. The processing unit for supporting mobile TV may process media data conforming to a standard for Digital Multimedia Broadcasting (DMB), Digital Video Broadcasting (DVB), or mediaFlo™.

Each of the aforementioned components of the electronic device may include one or more parts, and a name of the part is not limiting. The electronic device in accordance with various exemplary embodiments may include at least one of the aforementioned components, may omit some of the aforementioned components, and may include additional components. Some of the components may be combined into a single entity, and the entity may perform the same functions as the individual components.

Figure 3:
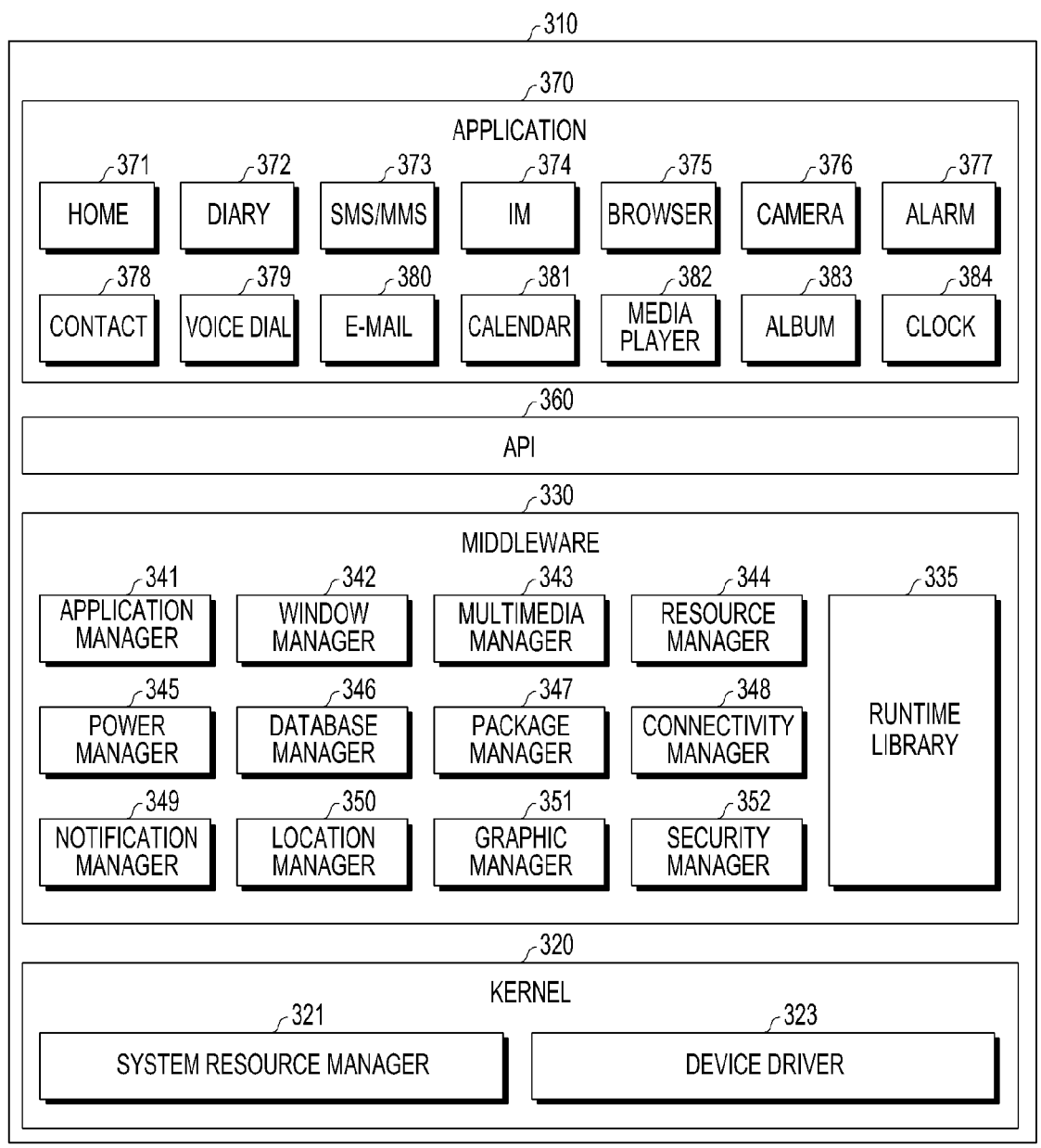
FIG. 3 is a block diagram of a program module according to an exemplary embodiment.

FIG. 3 is a block diagram of a program module according to an exemplary embodiment. The program module 310, e.g., a program such as program 140, may include an operating system (OS) controlling resources related to the electronic device (e.g., the electronic device 101) and/or various applications (e.g., the application processor 147) driven by the operating system. The operating system may include, for example, Android, iOS, Windows, Symbian, Tizen, or Bada.

The program module 310 may include a kernel 320, middleware 330, an application programming interface (API) 360, and/or an application 370. At least a part of the program module 310 may be preloaded on the electronic device or may be downloaded from an external electronic device (e.g., the electronic devices 102 and 104 or server 106).

The kernel 320 may include a system resource manager 321 and/or a device driver 323. The system resource manager 321 may perform control, allocation, or recovery of system resources. According to an exemplary embodiment, the system resource manager 321 may include a process managing unit, a memory managing unit, or a file system managing unit. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. According to an exemplary embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while the application 370 is being executed. The runtime library 335 may perform input/output management, memory management, or operations on arithmetic functions.

The application manager 341 may manage the life cycle of at least one application of the applications 370. The window manager 342 may manage GUI resources used on the screen. The multimedia manager 343 may grasp formats necessary to play various media files and use a codec appropriate for a format to perform encoding or decoding on media files. The resource manager 344 may manage resources, such as source code of at least one of the applications 370, memory, or storage space.

The power manager 345 may operate together with a basic input/output system (BIOS) to manage battery or power and to provide power information necessary for operating the electronic device. The database manager 346 may generate, search, or vary a database to be used in at least one of the applications 370. The package manager 347 may manage installation or update of an application that is distributed in the form of a package file.

The connectivity manager 348 may manage wireless connectivity, such as Wi-Fi or Bluetooth. The notification manager 349 may display an event or an event notification, such as an incoming message, appointment, or proximity notification, without interfering with the user. The location manager 350 may manage locational information on the electronic device. The graphic manager 351 may manage graphic effects to be offered to the user and their related user interface. The security manager 352 may provide various security functions necessary for system security or user authentication. According to an exemplary embodiment, when the electronic device (e.g., the electronic device 101) has telephony capability, the middleware 330 may further include a telephony manager for managing voice call or video call functions of the electronic device.

The middleware 330 may include a middleware module forming a combination of various functions of the above-described components. The middleware 330 may provide a specified module per type of the operating system in order to provide a differentiated function. Further, the middleware 330 may dynamically omit some existing components or add new components.

The API 360, e.g., the API 145, may be a set of API programming functions and may have different configurations depending on operating systems. For example, in the case of Android or iOS, one API set may be provided per platform, and in the case of Tizen, two or more API sets may be offered per platform.

The application 370 (e.g., the application processor 147) may include one or more applications that may provide functions such as a home application 371, a dialer application 372, an SMS/MMS application 273, an instant message (IM) application 374, a browser application 375, a camera application 376, an alarm application 377, a contact application 378, a voice dial application 379, an email application 380, a calendar application 381, a media player application 382, an album application 383, a clock application 384, a health-care application (e.g., configured to measure a degree of a workout or blood sugar), or an application for provision of environmental information (e.g., provision of air pressure, moisture, or temperature information).

According to an exemplary embodiment, the application 370 may include an application (hereinafter, "information exchanging application" for convenience) supporting information exchange between the electronic device (e.g., the electronic device 101) and an external electronic device (e.g., the electronic devices 102 and 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, the email application, the health-care application, or the environmental information application) to the external electronic device (e.g., the electronic devices 102 and 104). Further, the notification relay application may receive notification information from the external electronic device and may provide the received notification information to the user.

The device management application may perform at least some functions of the external electronic device (e.g., the electronic device 102 or 104) communicating with the electronic device (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an exemplary embodiment, the application 370 may include an application (e.g., a healthcare application of a mobile medical device) designated according to an attribute of the external electronic device (e.g., the electronic devices 102 and 104). According to an exemplary embodiment, the application 370 may include an application received from the external electronic device (e.g., the server 106 or electronic devices 102 and 104). According to an exemplary embodiment, the application 370 may include a preloaded application or a third party application downloadable from a server. The names of the components of the program module 310 according to the shown embodiment may be varied depending on the type of operating system.

According to an exemplary embodiment, at least a part of the program module 310 may be implemented in software, firmware, hardware, or in a combination of two or more thereof. At least a part of the programming module 310 may be implemented (e.g., executed) by a processor (e.g., the processor 210). At least a part of the program module 310 may include a module, program, routine, set of instructions, process, or the like for performing one or more functions.

The term 'module' may refer to a unit including hardware, software, firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of Application Specific Integrated Circuit (ASIC) chips, Field Programmable Gate Arrays (FPGAs), or Programmable Logic Arrays (PLAs) that perform some operations, which are already known or will be developed in the future.

According to an exemplary embodiment, at least a part of the device (e.g., modules or their functions) or method (e.g., operations) may be implemented as instructions stored in a computer-readable storage medium in the form of a program module. The instructions, when executed by a processor (e.g., the processor 120), may enable the processor to carry out a corresponding function. The memory 130 may be a computer-readable storage medium.

The computer-readable storage medium may include a hardware device, such as hard discs, floppy discs, and magnetic tapes, optical media such as Compact Disc ROMs (CD-ROMs) and Digital Versatile Discs (DVDs), magneto-optical media such as floptical disks, ROMs, RAMs, Flash Memories, or the like. Examples of the program instructions may include not only machine language codes but also high-level language codes which are executable by various computing means using an interpreter. The aforementioned hardware devices may be configured to operate as one or more software modules to carry out various exemplary embodiments, and vice versa.

Modules or programming modules in accordance with various exemplary embodiments may include at least one or more of the aforementioned components, omit some of them, or further include other additional components. Operations performed by modules, programming modules or other components in accordance with various exemplary embodiments may be carried out sequentially, simultaneously, repeatedly, or heuristically. Furthermore, some of the operations may be performed in a different order, or omitted, or additional operation(s) may be included. The exemplary embodiments disclosed herein are presented for description and to provide a greater understanding of one or more exemplary embodiments, and do not limit the scope of the present disclosure. Accordingly, the scope of the present disclosure should be interpreted as including all changes, equivalents, and various exemplary embodiments based on the technical spirit of the present disclosure.

Figure 4:
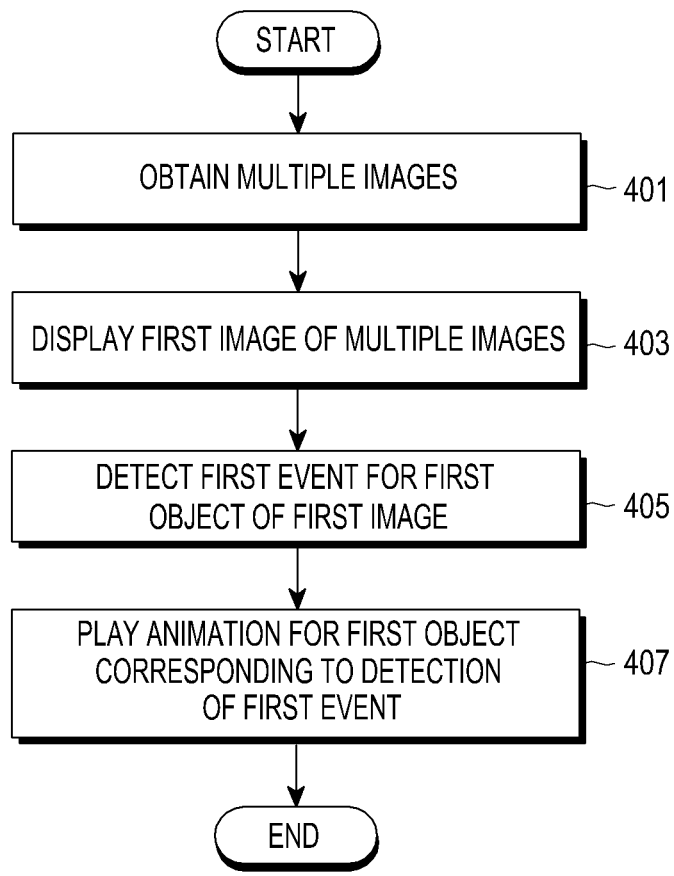
FIG. 4 is a flowchart illustrating a method of playing an animation according to an exemplary embodiment.

FIG. 4 is a flowchart illustrating a method of playing an animation according to an exemplary embodiment. The method may be executed by the electronic device 101, and the electronic device may be controlled to execute the method.

In operation 401, the electronic device 101 may obtain a plurality of images. The electronic device 101 may obtain the plurality of images through a camera module included in the electronic device 101. Specifically, the electronic device 101 may capture images at a predetermined period. The predetermined period may be previously set to enable an animation to be naturally played. Alternatively, the electronic device 101 may obtain the plurality of images captured over time from another electronic device. For example, the electronic device 101 may obtain a plurality of images from another electronic device through a communication module included in the electronic device 101. According to an exemplary embodiment, the electronic device 101 may stabilize each of the obtained images. The electronic device 101 may register at least one of the plurality of images in a first frame to correct an alignment of objects. The electronic device 101 may correct an irregular camera movement that occurs due to, for example, a handshake, based on a stabilization algorithm. The stabilization algorithm may include optical image stabilization, software-based digital image stabilization, or a combination of the optical image stabilization and the software-based digital image stabilization. According to an exemplary embodiment, conversion from a previous frame to a current frame is identified by a function detection and Lucas-Kanade light flow for a plurality or all of the frames. The conversion may be performed based on three parameters including, but not limited to, a dx (movement in an x direction), a dy (movement in a y direction), and a da (angle). The conversion parameters may be accumulated to obtain the trajectory of x, y, and angle in each frame. The trajectory may be smoothed using a Kalman filter. Further, the modified conversion parameters may apply to the frames, stabilizing the images. When the plurality of images are stabilized, the plurality of images, i.e., each frame, may be registered. While the frames are registered, conversion parameters for all of the frames may be detected using a feature extraction and light flow. The sequence of frames is then warped back to first frame using composition of identified transformation parameters. Similarly, the depth map may also be registered in the first frame of the sequence of frames to correct an alignment error.

In operation 403, the electronic device 101 may display a first image of the plurality of images. Here, the first image may be an image first displayed. For example, the first image may be the first image of the plurality of images, but is not limited thereto. An animation image corresponding to the first image may be an animation in which the first image is first displayed and then other images are sequentially displayed. Accordingly, the first image may be denoted as a still image.

In operation 405, the electronic device 101 may detect a first event set to start to play an animation image of a first object of the first image. For example, the electronic device 101 may detect a user's view for the first object or a touch input on the first object. Or, the electronic device 101 may detect the first event based on a result of an analysis of at least one of motion information of an obtained preview image, motion information of the electronic device 101, and obtained sound information. Here, the first event may be, as non-limiting examples, to designate a particular object of the first image, i.e., the still image, to input a particular sound, or to apply a particular movement to the electronic device. It should be appreciated by one of ordinary skill in the art that the event is not limited thereto as long as the event may be detected by the electronic device. The electronic device 101 may obtain the first event based on an input from the outside. For example, the electronic device 101 may obtain the first event by displaying a graphic user interface to derive the input of the first event after generating the animation image. Or, the electronic device 101 may analyze the animation image and obtain the first event based on a result of the analysis. For example, the electronic device 101 may determine whether a facial object of the animation image is a smiling animation by analyzing the animation image. The electronic device 101 may set a smiling look of the animation image viewer to be captured as the first event that is a condition to play the animation image corresponding to the facial object. Or, the electronic device 101 may perform mere detection of an object whose movement exceeds a predetermined threshold of the animation image as detection of the first event. That is, the electronic device 101, upon reception of a request for playing the animation image, may play the animation image only for the object whose movement exceeds the threshold.

The electronic device 101, when detecting a user's designation, performs object segmentation to determine which object has been designated. The segmentation process is described below in further detail.

In operation 407, the electronic device 101 may play the animation for the first object corresponding to the designation of the first event. The electronic device 101 may maintain the display of the first image for the remaining area except the first object. Accordingly, the electronic device 101 may play the animation image so that only some objects of the still image may be animated. The electronic device 101 may obtain a target object from each of the plurality of images by segmenting each of the plurality of images. The electronic device 101 may play the animation image for a particular object by displaying the target objects for play of the animation image while sequentially changing the target objects to the objects in each of the plurality of images. According to an exemplary embodiment, the electronic device 101 may play the animation image for the particular object by tracking the target object in other images while replacing the target object with the tracked area and displaying the same.

According to an exemplary embodiment, the electronic device 101 may set an event for each object of the still image. For example, the still image may include a first object and a second object. The electronic device 101 may obtain a first event to start an animation of the first object and a second event to start an animation of the second object. Here, the first event may differ from the second event. Accordingly, the electronic device playing an animation message may play the animation of the first object when detecting the first event. In this case, the objects of the still image other than the first object may remain displayed without change. In other words, the electronic device may play only the animation of the first object corresponding to the detection of the first event. Meanwhile, when the second event is detected, the playing electronic device may play only the animation of the second object.

The electronic device 101 may store the first event in association with the object of the animation image. For example, the electronic device 101 may include information on the first event in metadata of the animation image. Or, the electronic device 101 may store the animation image, with the animation image mapped to the first event. The information on the first event may contain information on hardware that may detect an event and content detected by the hardware.

According to an exemplary embodiment, the electronic device 101 may display an animation effect in which the animation image for the designated object is played while the remaining area remains constant. Further, the electronic device 101 may set an event that is a condition for starting to play each animation. Upon detection of a particular event, the electronic device 101 may play an animation image of an object corresponding to the detected event.

Figure 5:
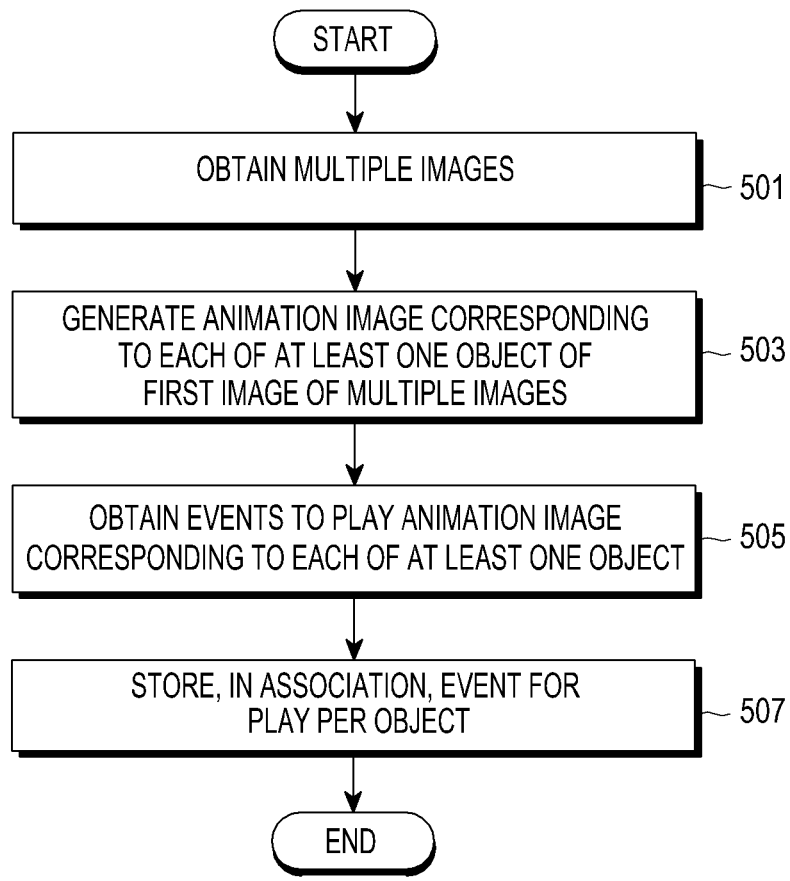
FIG. 5 is a flowchart illustrating a method of generating an animation image according to an exemplary embodiment.

FIG. 5 is a flowchart illustrating a method of generating an animation image according to an exemplary embodiment. The method may be executed the electronic device 101, and the electronic device may be controlled to execute the method.

In operation 501, the electronic device 101 may obtain a plurality of images. For example, the electronic device 101 may obtain a first image including a first object and a second image including a second object.

In operation 503, the electronic device 101 may generate an animation image corresponding to each of at least one object of a first image of the plurality of images. For example, the electronic device 101 may segment each of the plurality of images to identify the first object and the second object from each of the plurality of images. Further, the electronic device 101 may generate an animation image for the first object and an animation image for the second object. The electronic device 101 may perform segmentation using image information such as a depth map or a color value.

In operation 505, the electronic device 101 may obtain an event for starting to play the animation image per object. The electronic device 101 may obtain an event through image analysis, through detected information, or through an external input. For example, the electronic device 101 may obtain per-object event information as shown in Table 1.

TABLE 1

| | Event |
|---|---|
| First object | Hardware information: Camera module<br>Content of event: Detection of smiling face, |
| Second object | Hardware information: Acceleration sensor<br>Content of event: Right movement of electronic device |

As shown in Table 1, the event information may include at least one of hardware information and content of event.

Meanwhile, the electronic device 101 may set a plurality of events for one object. For example, as shown in Table 1, the electronic device 101 may designate the content of event as a smiling face for the first object while additionally setting a designation for the first object as an event.

In operation 507, the electronic device 101 may store events to be played respectively in association with the objects. The electronic device 101 may subsequently detect an event using the stored information and may play an animation image for the object corresponding to the detected event. Or, the electronic device 101 may transmit the stored information to another electronic device, and the other electronic device may detect an event using the stored information and play an animation image for the object corresponding to the detected event.

For example, the electronic device 101 may obtain a preview image through a camera module and analyze the preview image to detect a user's smiling face. The electronic device 101 may play an animation for the first object corresponding to the detection of the smiling face and may maintain the display of the second object in the still image. The electronic device 101 may detect a movement of the electronic device 101 through an acceleration sensor, and the electronic device 101 may detect motion information in a right direction. The electronic device 101 may play an animation for the second object corresponding to the detection of the movement in the right direction and may maintain the display of the first object in the still image.

FIGS. 6A to 6F are views illustrating examples of generating and playing animation images according to one or more exemplary embodiments.

Figure 6A:
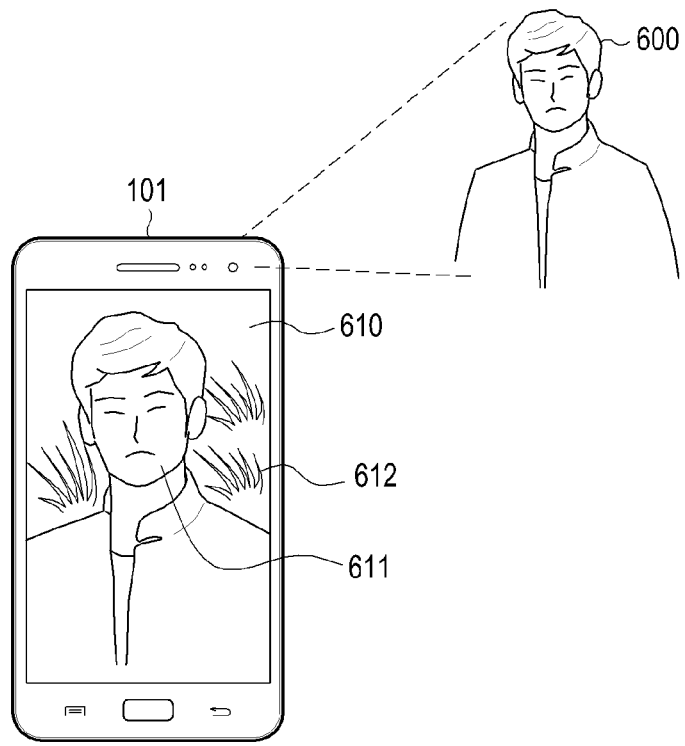
FIGS. 6A to 6F are views illustrating examples of generating and playing animation images according to one or more exemplary embodiments.
Figure 6B:
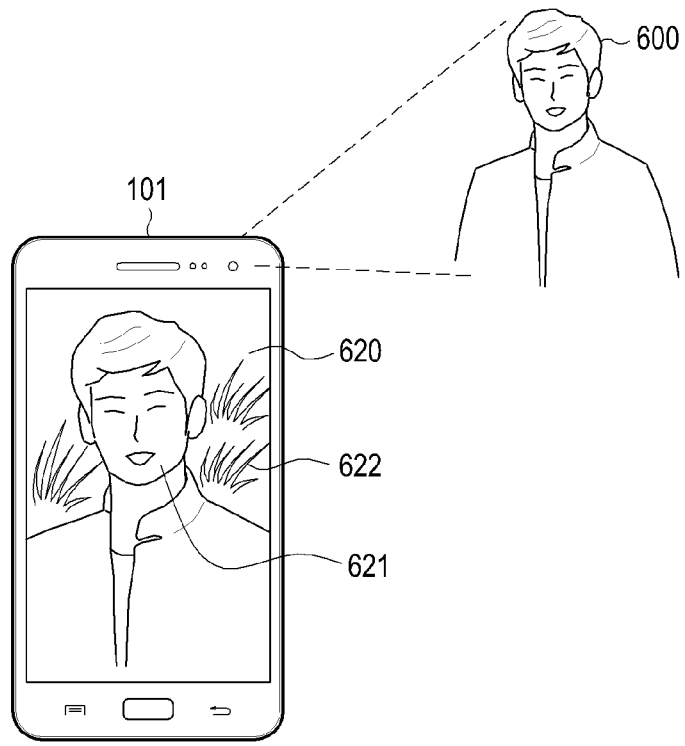

Referring to FIGS. 6A and 6B, the electronic device 101 may obtain a first image and a second image. For example, even when the user activates a capturing button of the electronic device 101 once, the electronic device 101 may capture and obtain a plurality of images during a predetermined period. The electronic device 101 may capture an image of an object 600 of an expressionless face at a first view as shown in FIG. 6A to obtain a first image 610 and may capture an image of an object 600 of a smiling face at a second view as shown in FIG. 6B to obtain a second image 620. The electronic device 101 may include a camera module that may capture an image of an object 600. Or, the electronic device 100 may receive the first image 610 and the second image 620 through a communication module from another electronic device. The first image 610 may be a portrait picture of an expressionless face, and the second image 620 may be a portrait picture of a smiling face. The first image 610 may include a face object 611 and a background object 612. The second image 620 may include a face object 621 and a background object 622.

Figure 6C:
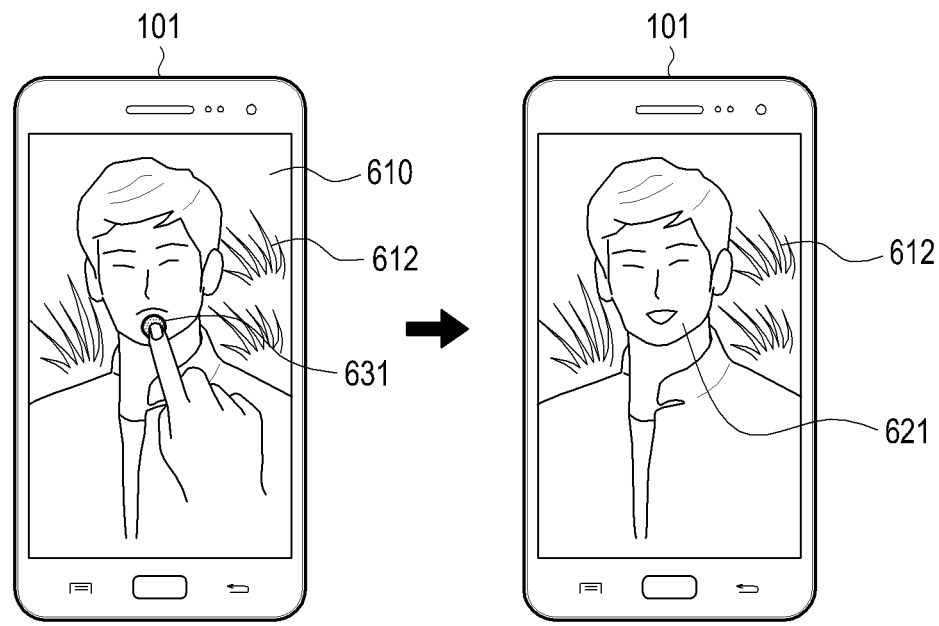

The above-described FIGS. 6A and 6B correspond to capturing images, and FIGS. 6C and 6D, described below, correspond to displaying images. The electronic device 101 may first display the first image 610, i.e., the still image as shown in FIG. 6C. The user may designate the face object 611 of the first image 610. The electronic device 101 may play an animation image for some object by changing the face object 611 corresponding to the user's designation to the face object 621 in the second image 620 to display the same. Although the electronic device 101 displays two images to play the animation image for the face object, this is merely for ease of description. The electronic device 101 may display the animation image by sequentially changing and displaying a plurality of images in the facial area (FIG. 6C). Meanwhile, the electronic device 101 may maintain the display of the background object 612 from which no designation is detected.

Figure 6D:
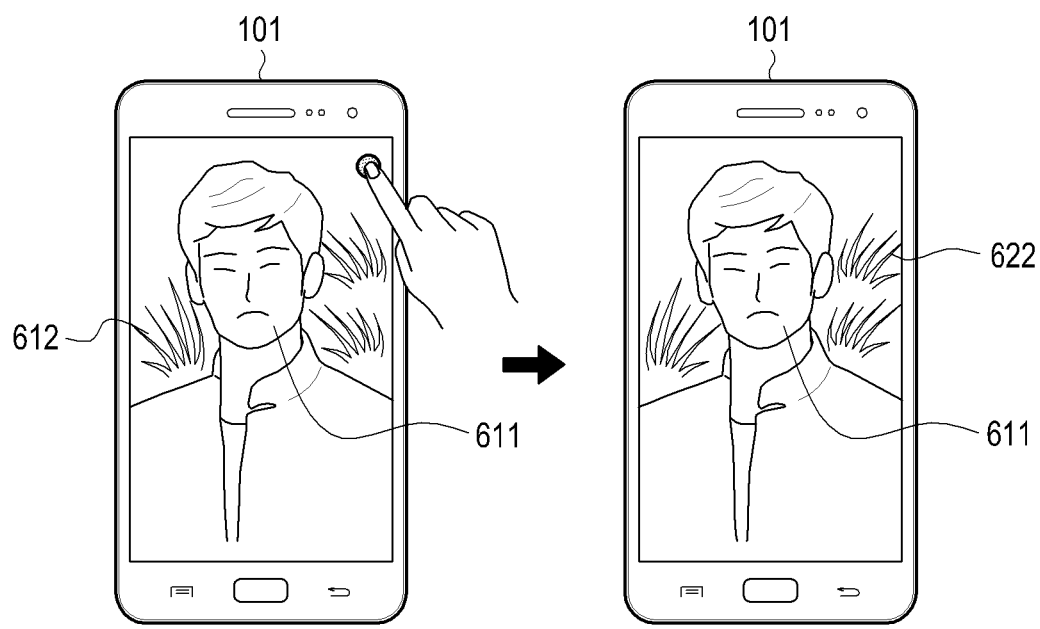

The electronic device 101 may first display the first image 610, i.e., the still image as shown in FIG. 6D. The user may designate the background object 612 of the first image 610. The electronic device 101 may play an animation image for some object by changing the background object 611 corresponding to the user's designation to the background object 622 in the second image 620 to display the same. Meanwhile, the electronic device 101 may maintain the display of the face object 611 from which no designation is detected.

The electronic device 101 may store the obtained first event in association with the generated animation image. For example, the electronic device 101 may store information on the first event in metadata of the animation image. Or, the electronic device 101 may store information on the first event, with the information mapped to the animation image. Subsequently, the electronic device 101 may capture a preview image and may detect the first event by detecting the user's smiling face. The electronic device 101 may play the animation image for the face object corresponding to the same.

Figure 6E:
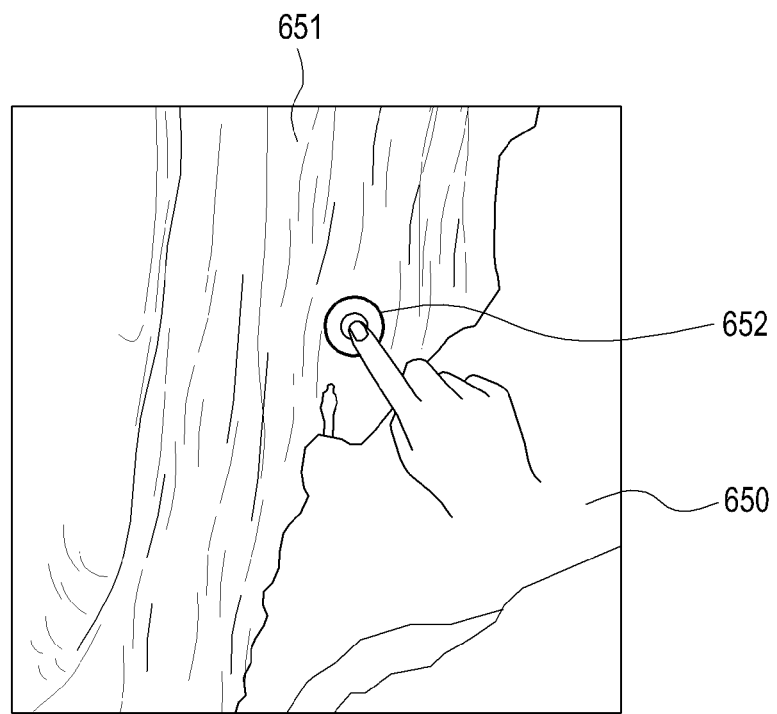

FIG. 6E is a view illustrating an animation image 650 according to an exemplary embodiment. The animation image 650 may be an animation in which a background object 651 is moved. The user may designate (652) the background object 651, and the electronic device 101 may play an animation image in which a waterfall, the background object 651, flows down.

Figure 6F:
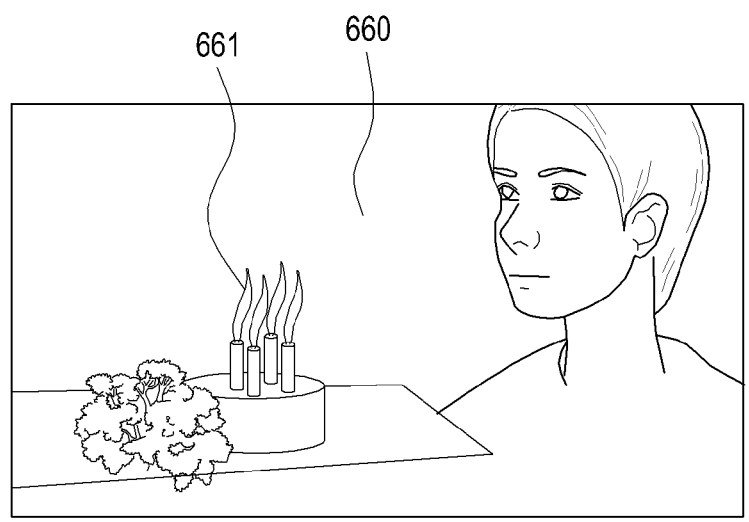

FIG. 6F is a view illustrating an animation image 650 according to an exemplary embodiment. The animation image 660 may be an animation in which a candle fire object 661 shakes. The electronic device 101 may previously set an event of a sound input as an event for playing an animation image for the candle fire object 661. The user may blow air on the electronic device 101, and the microphone of the electronic device 101 may obtain a sound from the user. The electronic device 101 may determine that an event is detected through obtaining the sound to play an animation image, e.g., in which the candle fire object 661 is shaking.

Although not shown, the electronic device 101 may set the user's viewing point to the first event. The electronic device 101 may obtain the user's viewing point by analyzing the obtained preview image and may play the animation image for the object corresponding to the event depending on whether the obtained viewing point complies with the first event.

Figure 7A:
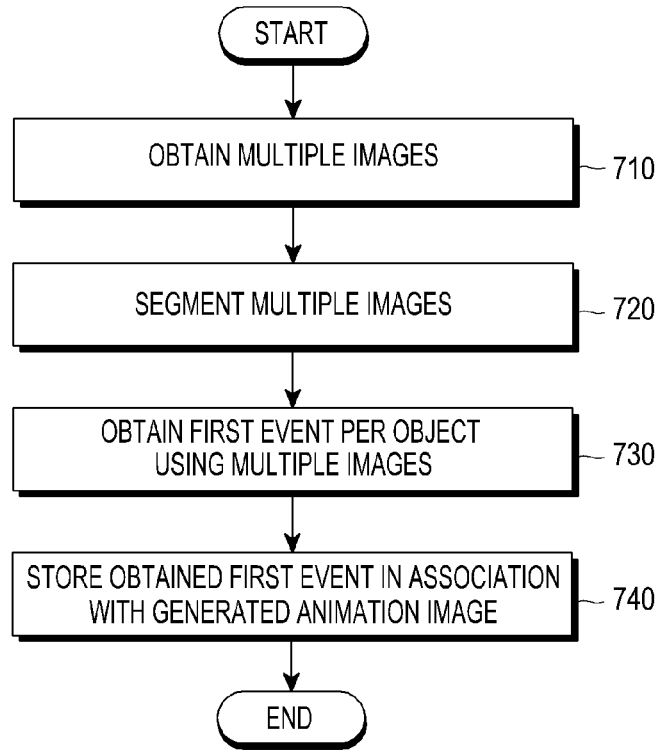
FIG. 7A is a flowchart illustrating a method of generating an animation image according to an exemplary embodiment.
Figure 7B:
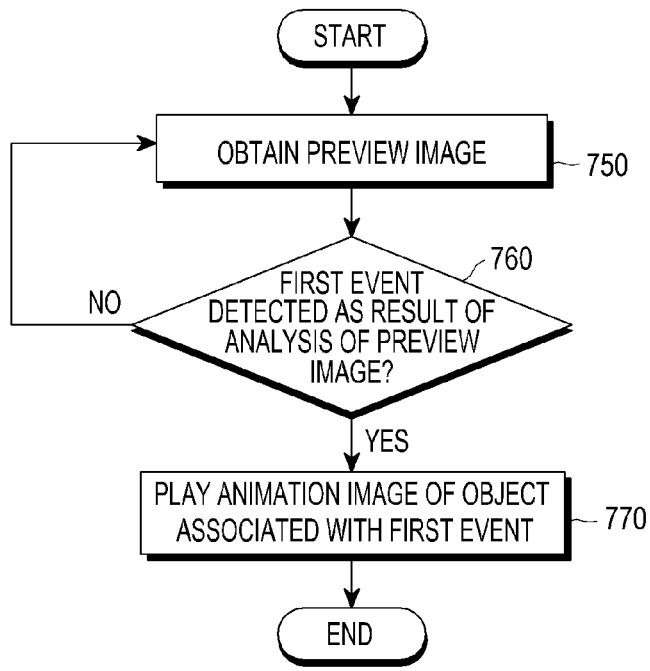
FIG. 7B is a flowchart illustrating a method of playing an animation image according to an exemplary embodiment.
Figure 8A:
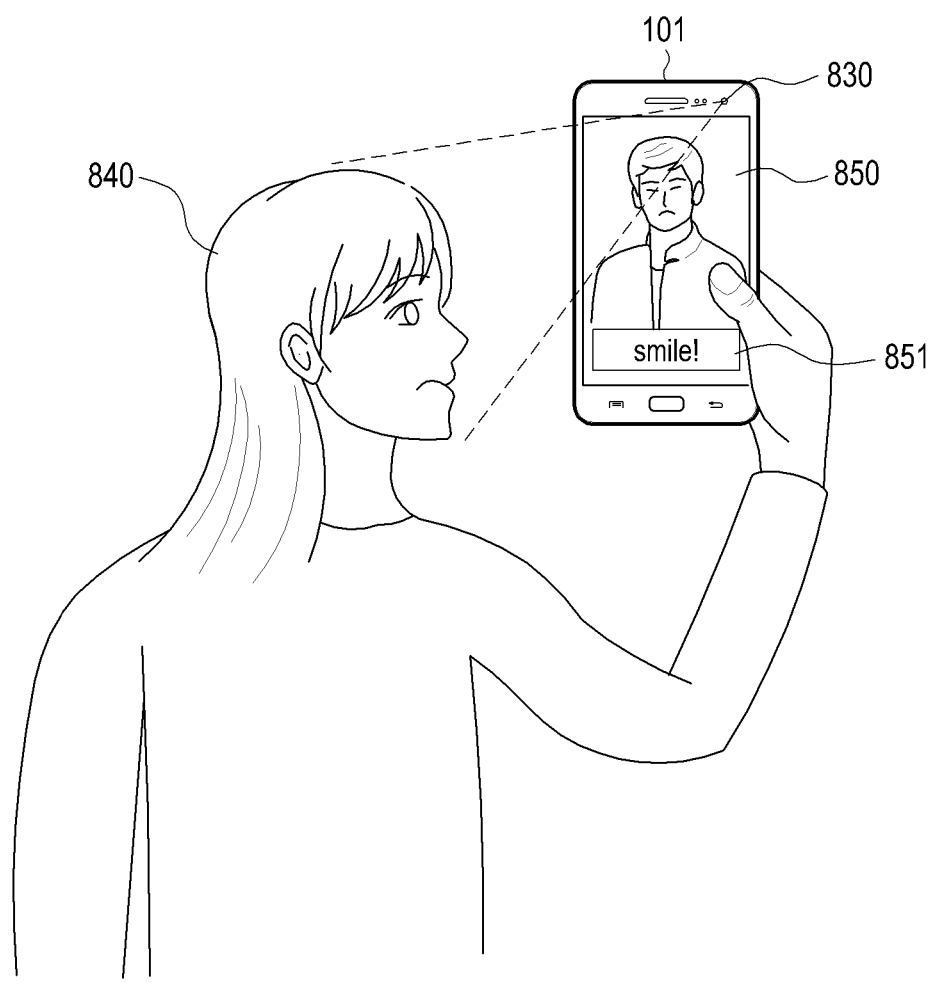
FIGS. 8A and 8B are views illustrating examples of generating and playing animation images according to one or more exemplary embodiments.
Figure 8B:
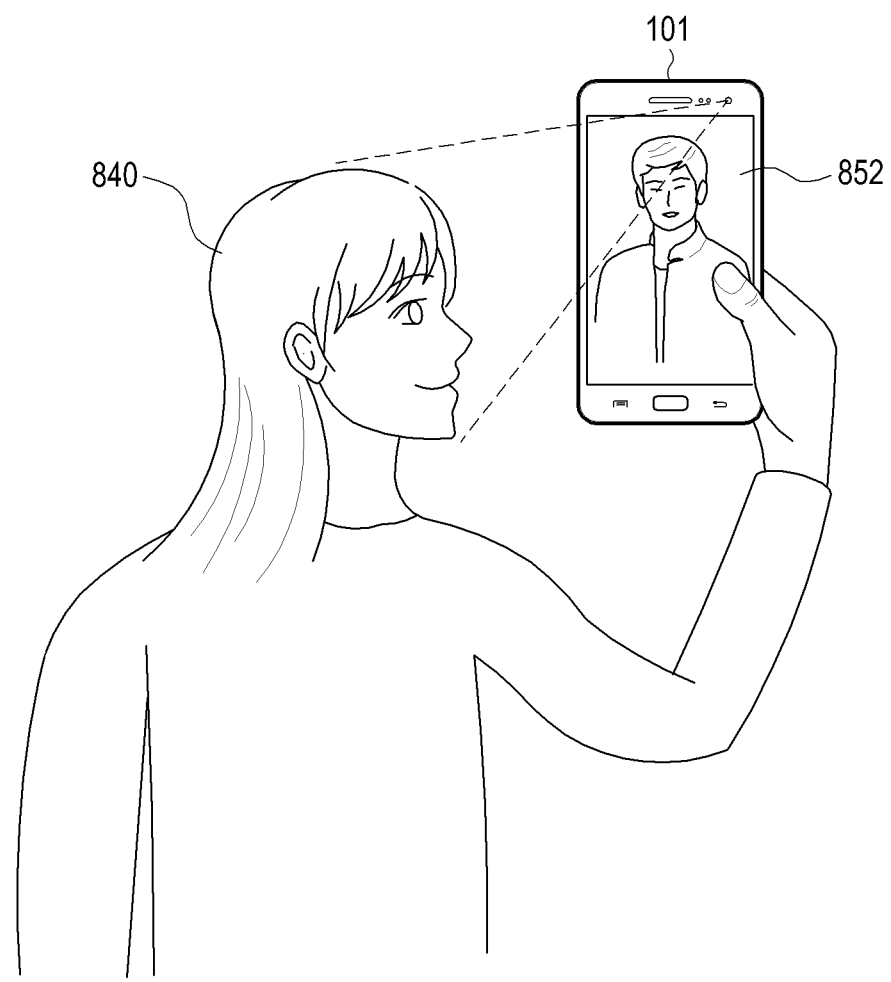

FIG. 7A is a flowchart illustrating a method of generating an animation image according to an exemplary embodiment. The method may be executed the electronic device 101, and the electronic device may be controlled to execute the method. FIG. 7B is a flowchart illustrating a method of playing an animation image according to an exemplary embodiment. The method may be executed the electronic device 101, and the electronic device may be controlled to execute the method. An embodiment is described in detail with reference to FIGS. 7A and 7B along with FIGS. 8A and 8B. FIGS. 8A and 8B are views illustrating examples of generating and playing animation images according to one or more exemplary embodiments.

Referring to FIG. 7A, the electronic device 101 may obtain a plurality of images in operation 710. For example, the electronic device 101 may obtain a first image 610 and a second image 620, as shown in FIGS. 6A and 6B.

In operation 720, the electronic device 101 may segment each of the plurality of images and may obtain an object from each of the plurality of images.

In operation 730, the electronic device 101 may obtain a first event per object using the plurality of images. For example, the electronic device 101 may apply a face recognition algorithm to the first image 610 and may obtain the information that the face object is expressionless from the first image 610. The electronic device 101 may apply a face recognition algorithm to the second image 620 and may obtain the information that the face object is smiling from the second image 620. According to an exemplary embodiment, the face recognition algorithm may determine a smiling face, frowned face, or expressionless face based on at least one of whether a tooth is visible, a direction of a mouth corner, a shape of an eye, whether there is an eye wrinkle, and whether there is a wrinkle between the eyebrows. The electronic device 101 may determine that the animation image switches from an expressionless face to a smiling face and may set a smile to the animation image information. Further, the electronic device 101 may set the first event, which is a condition for playing the animation image, to the smile that is animation image information. According to an exemplary embodiment, the user may input the first event to the electronic device 101, and the electronic device 101 may set the first event to the smile based on the user's input. When the smile is set to the first event, the electronic device 101 may include hardware information for detecting the smile and content detected from the hardware. For example, the electronic device 101 may store the hardware information, "camera module" that may detect a first event of a smile, and the content detected by the hardware, "a smile is detected from a captured image," as event information corresponding to the "face object."

In operation 740, the electronic device 101 may store the obtained first event in association with an animation image generated per object. For example, the electronic device 101 may store information on the first event in metadata of the animation image. The electronic device 101 may store the information on the first event corresponding to the "face object."

Referring to FIG. 7B, the electronic device 101 may obtain a preview image upon play, in operation 750. For example, as shown in FIG. 8A, the electronic device 101 may obtain the preview image through the camera module 830 disposed on a front surface thereof. The electronic device 101 may display a still image 850 of an animation image. The electronic device 101 may identify hardware information for detecting the first event based on the information on the first event and may activate the camera module 830 corresponding to the same. The camera module 830 may obtain a preview image and the electronic device 101 might not display the preview image. The electronic device 101 may display an event information deriving object 851 on the still image 850 based on the first event information.

In operation 760, the electronic device 101 may determine whether the first event is detected as a result of analysis of the preview image. For example, as shown in FIG. 8B, the electronic device 101 may obtain a face image of the user 840 and may apply a face recognition algorithm to the preview image to determine the look of the user 840. As shown in FIG. 8A, the electronic device 101 may detect the information that the user 840 has no facial expression from the preview image and may determine that a first event of a smile is not detected.

Specifically, the electronic device 101 may analyze the presence of a smile using an image captured for an outer appearance. For example, for the given image, facial features and orientation are calculated by the Active Appearance Model (AAM). Based on the AAM points, a second electronic device 102 may determine a mesh corresponding to the face, identify other features of the face, such as a nose, a lip, or a mouth, and may identify the presence or absence of a smile from the features.

When the first event is detected, the electronic device 101 may play an animation image associated with the first event in operation 770. For example, as shown in FIG. 8B, the electronic device 101 may obtain a preview image for the user 840. The electronic device 101 may apply a face recognition algorithm to the preview image to determine that the user 840 is smiling. That is, the electronic device 101 may determine that the first event corresponding to the face object is detected. The electronic device 101 may play the animation image for the face object corresponding to the detection of the first event to change a face object area of the still image 850 to another image 852 of the animation image and display the same. Although, as shown in FIGS. 8A and 8B, the electronic device 101 plays the animation image as if the electronic device 101 changes the still image 850 to another image 852, this is merely for ease of description. The electronic device 101 may play the animation image by sequentially changing the plurality of images included in the animation image from the still image 850 and displaying the same. As described above, the electronic device 101 may play the animation image only for the face area such as the user's eye, nose, or mouth while maintaining the display of the still image for the remaining area.

As described above, according to an exemplary embodiment, the electronic device 101 may set the first event per object based on the information obtained from the plurality of images constituting the animation image. Or, the electronic device 101 may set the first event based on the user's input. Embodiments in which the first event is based on various inputs from a user are described below.

The electronic device 101 may set the user's viewing point to the first event. The electronic device 101 may obtain the user's viewing point by analyzing the obtained preview image and may play the animation image depending on whether the obtained viewing point complies with the first event.

Figure 9A:
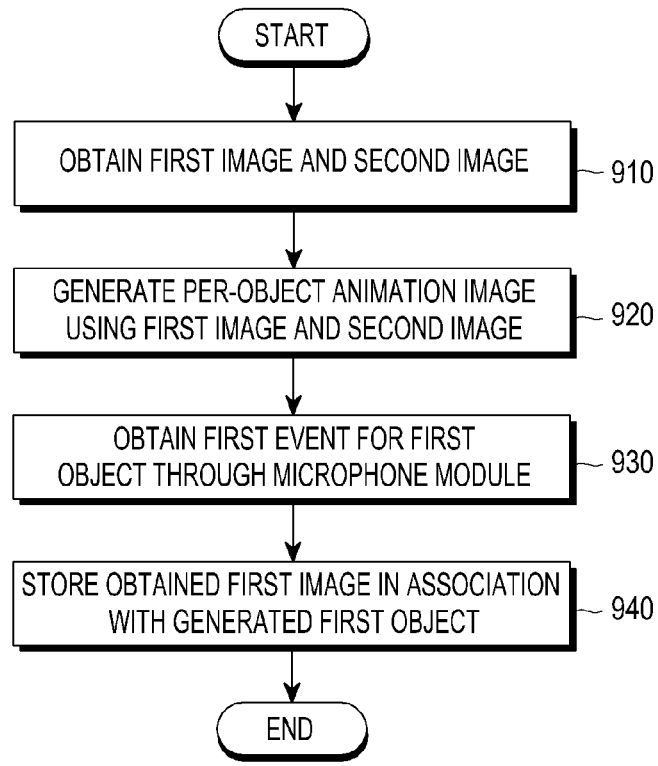
FIG. 9A is a flowchart illustrating a method of generating an animation image according to an exemplary embodiment.
Figure 9B:
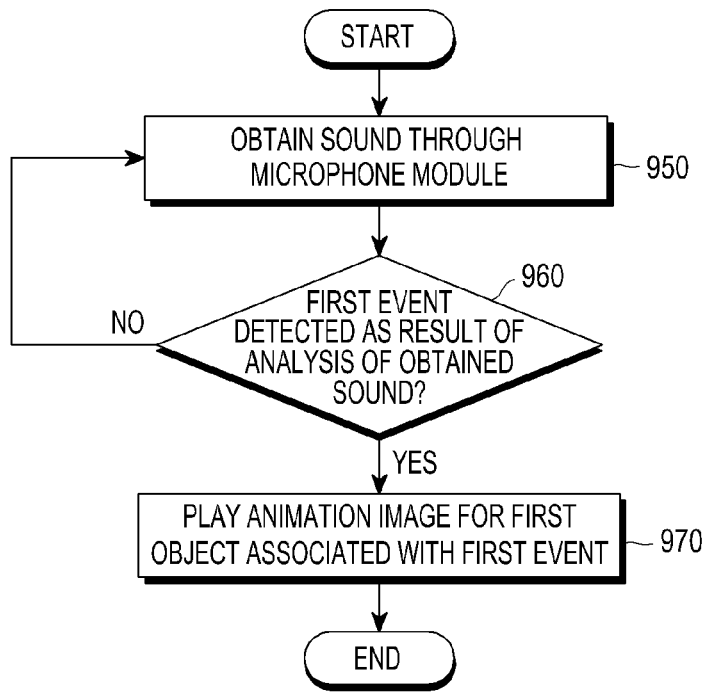
FIG. 9B is a flowchart illustrating a method of playing an animation image according to an exemplary embodiment.

FIG. 9A is a flowchart illustrating a method of generating an animation image according to an exemplary embodiment. The method may be executed the electronic device 101, and the electronic device may be controlled to execute the method. FIG. 9B is a flowchart illustrating a method of playing an animation image according to an exemplary embodiment. The method may be executed the electronic device 101, and the electronic device may be controlled to execute the method. One or more exemplary embodiments are described in detail with reference to FIGS. 9A and 9B along with FIGS. 10A to 10G. FIGS. 10A to 10G are views illustrating examples of generating and playing animation images according to one or more exemplary embodiments.

Figure 10A:
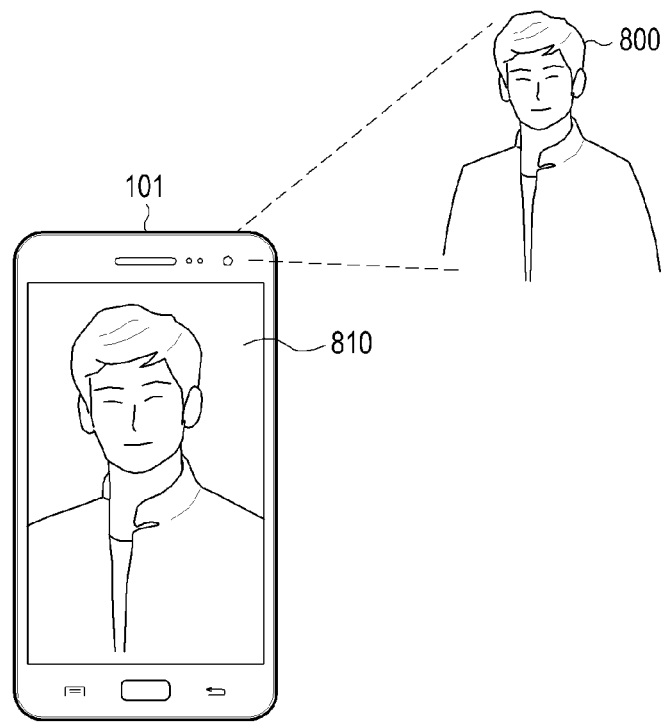
FIGS. 10A to 10G are views illustrating examples of generating and playing animation images according to one or more exemplary embodiments.
Figure 10B:
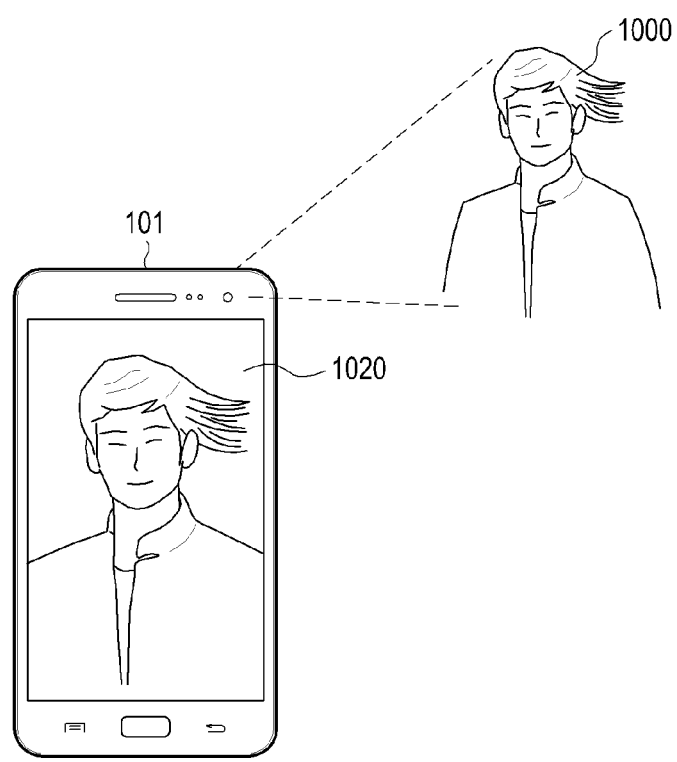

Referring to FIG. 9A, the first electronic device may obtain a first image and a second image in operation 910. The electronic device 101 may capture an image of an object 1000 at a first view as shown in FIG. 10A to obtain a first image 1010 and may capture an image of an object 1000 at a second view as shown in FIG. 10B to obtain a second image 1020. The hair of the object 1000 at the second view may be bent to the right, and accordingly, the second image 1020 may include the hair that has been bent to the right.

In operation 920, the electronic device 101 may generate an animation image per object using the first image 810 and the second image 820. In particular, the electronic device 101 may generate an animation image for a first object, e.g., a hair object.

Figure 10C:
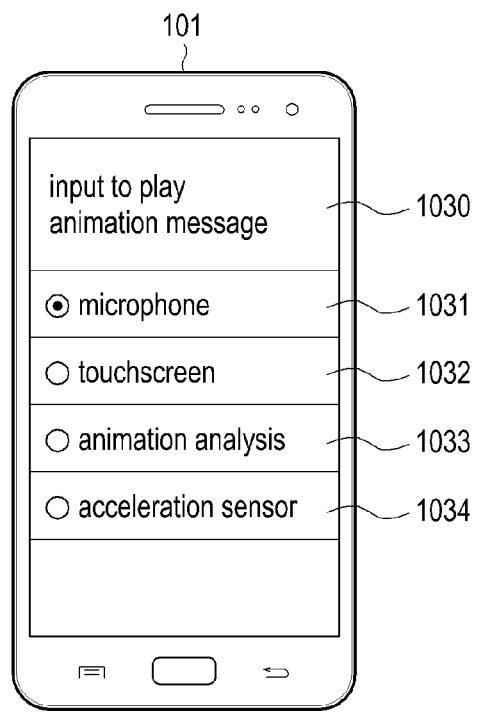

According to an exemplary embodiment, the electronic device 101 may display a graphic user interface 1030 for obtaining an event as shown in FIG. 10C. The graphic user interface 1030 may include various schemes 1031 to 1034 that may obtain a first event corresponding to the hair object. The user may designate any one of various schemes 1031 to 1034 of the graphic user interface 1030. The electronic device 101 may activate hardware that may obtain the first event according to the designated scheme and may obtain the first event through the activated hardware. For example, when the microphone 1031 is designated as a scheme to obtain the first event as shown in FIG. 10C, the electronic device 101 may activate at least one of the included microphones 1041 to 1043.

Figure 10D:
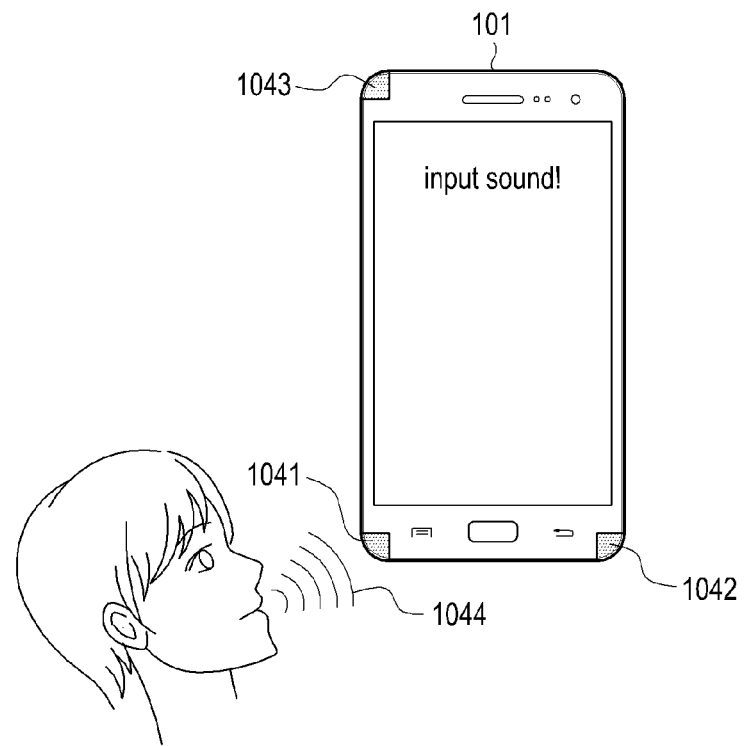

In operation 930, the electronic device 101 may obtain the event through the at least one microphone modules 1041, 1042, and 1043. The electronic device 101 may analyze a sound obtained through the at least one microphone 1041 to 1043 to obtain sound information and may set the obtained sound information to the first event. For example, as shown in FIG. 10D, the user of the electronic device 101 may speak a sound 1044. The electronic device 101 may obtain the sound 1044 sent from the user through at least one microphone 1041 to 1043. The electronic device 101 may analyze the sound obtained from each of the at least one microphone 1041 to 1043 to determine sound information including at least one of the magnitude of the sound, a voice recognition result of the sound, duration of the sound, and a direction in which the sound is generated. In particular, when the electronic device 101 has a plurality of microphones, the electronic device 101 may determine the direction in which the sound is generated using the sound obtained from each of the plurality of microphones. For example, the sound information may include the information that the sound is generated from a left side. The electronic device 101 may set the sound information to the first event. Meanwhile, as the first event information, the "microphone" that is information on hardware that may obtain the first event and sound information that is content detected by the microphone may be stored.

In operation 940, the electronic device 101 may store the obtained first event in association with a first object of the generated animation image. For example, the electronic device 101 may store information on the first event in metadata of the animation image. Or, the electronic device 101 may store information on the first event, with the information mapped to the animation image.

Figure 10E:
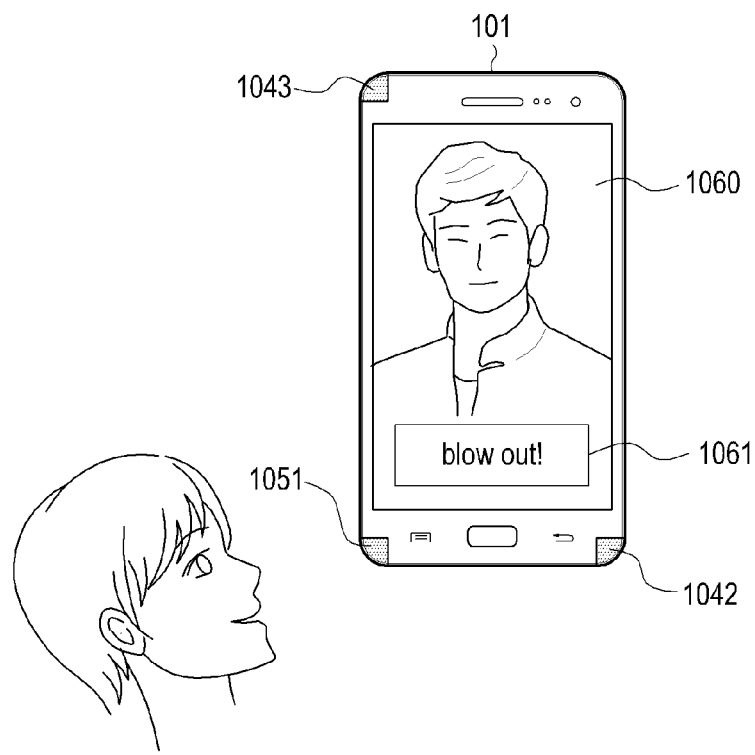
Figure 10F:
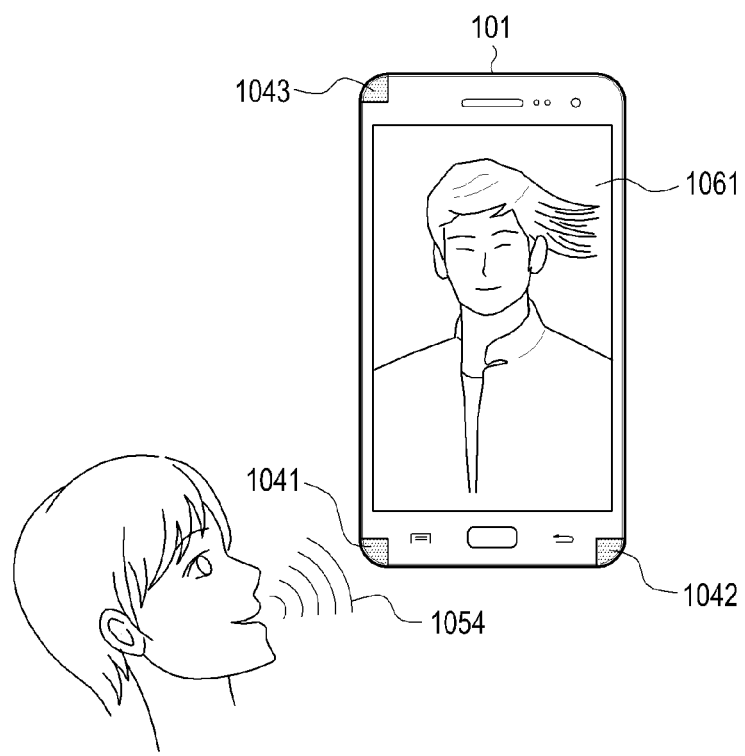

Referring to FIG. 9B, the electronic device 101 may obtain a sound through a microphone in operation 950. For example, as shown in FIG. 10F, the electronic device 101 may obtain a sound through at least one microphone 1041 to 1043. The electronic device 101 may display the received animation image and may display the still image 1060 of the animation image. The electronic device 101 may identify hardware information for detecting the first event based on the information on the first event and may activate the microphones 1041, 1042, and 1043 corresponding to the same. The microphones 1041, 1042, and 1043 each may obtain a sound. The electronic device 101 may display an event information deriving object 1061 on the still image 1060 based on the first event information (FIG. 10E).

In operation 960, the electronic device 101 may determine whether the first event is detected as a result of analysis of the sound. For example, as shown in FIG. 10F, the electronic device 101 may obtain a sound 1054 sent from the user and may determine sound information based on a result of analysis of the sound. As shown in FIG. 10F, the electronic device 101 may detect the information that the user has sent the sound from a left side and may determine that the first event is detected.

When the first event is detected, the electronic device 101 may play an animation image of a first object corresponding to the first event in operation 970. For example, as shown in FIG. 10F, the electronic device 101 may change a hair object of the still image 1060 to another image 1061 of the animation image and display the same. Although the electronic device 101 plays the animation image as if the electronic device 101 changes the still image 1060 to another image 1061, as shown in FIGS. 10E and 10F, this is merely for ease of description. The electronic device 101 may play the animation image by sequentially changing the plurality of images included in the animation image from the still image 1060. According to an exemplary embodiment, the electronic device 101 may play the animation only for the hair object of the still image 1060 and may maintain the display of the still image except the hair object 1060.

Figure 10G:
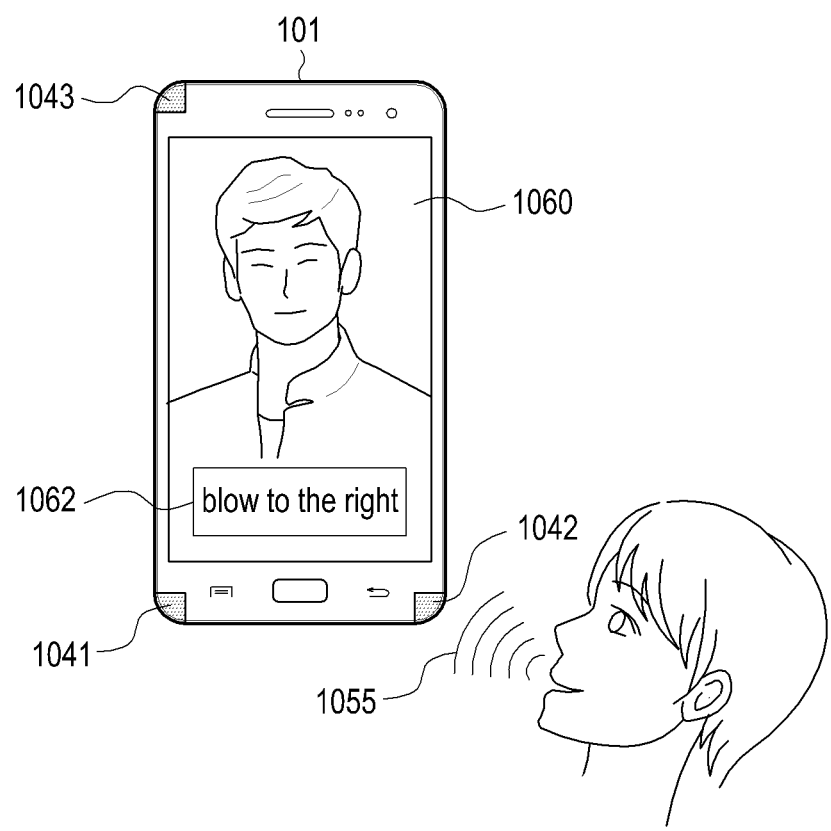

Meanwhile, as shown in FIG. 10G, the user may speak a sound 1055 from a right side. In this case, the electronic device 101 may analyze the sound 1055 to determine that the sound 1055 is generated from the right side. The electronic device 101 may determine that the first event is not detected based on the information that the direction in which the sound is generated differs from the direction in which the sound of the first event is generated. The electronic device 101 may maintain the display of the still image 1060 and may display an object 1062 describing the detected event.

Meanwhile, although the first event is described as the direction in which the sound is generated as described above, this is merely an example. According to an exemplary embodiment, the electronic device 101 may set the first event to at least one of the magnitude of the sound, a voice recognition result of the sound, a duration of the sound, and a direction in which the sound is generated.

Figure 11A:
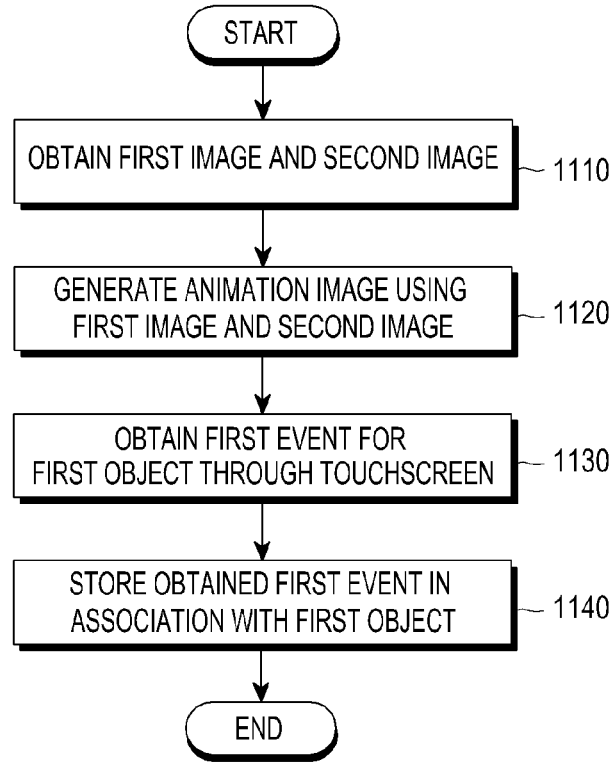
FIG. 11A is a flowchart illustrating a method of generating an animation image according to an exemplary embodiment.
Figure 11B:
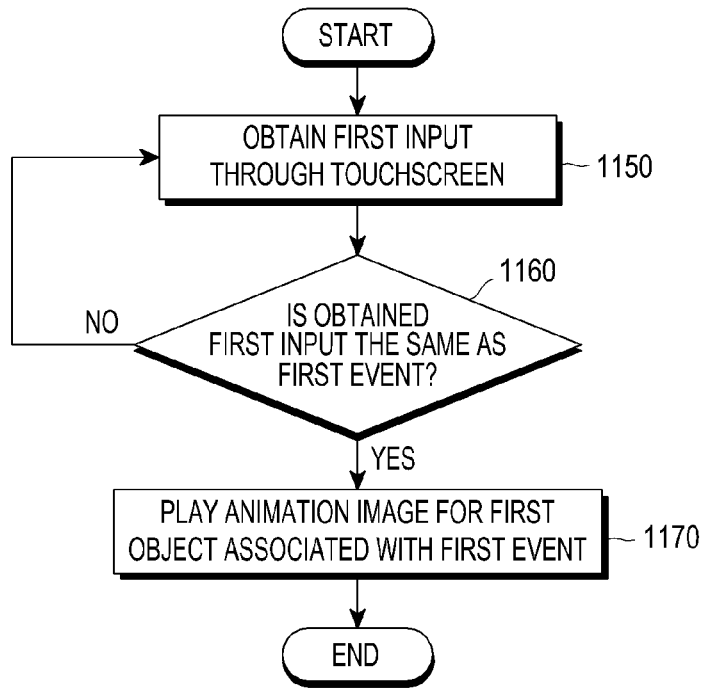
FIG. 11B is a flowchart illustrating a method of playing an animation image according to an exemplary embodiment.

FIG. 11A is a flowchart illustrating a method of generating an animation image according to an exemplary embodiment. The method may be executed the electronic device 101, and the electronic device may be controlled to execute the method. FIG. 11B is a flowchart illustrating a method of playing an animation image according to an exemplary embodiment. The method may be executed the electronic device 101, and the electronic device may be controlled to execute the method. One or more exemplary embodiments are described in detail with reference to FIGS. 11A and 11B along with FIGS. 12A to 12E. FIGS. 12A to 12E are views illustrating examples of generating and playing animation images according to one or more exemplary embodiments.

Referring to FIG. 11A, the first electronic device may obtain a first image and a second image in operation 1110. The electronic device 101 may capture an image of an object 1000 at a first view as shown in FIG. 10A to obtain a first image 1010 and may capture an image of an object 1000 at a second view as shown in FIG. 10B to obtain a second image 1020.

In operation 1120, the electronic device 101 may generate an animation image using the first image 1010 and the second image 1020. The electronic device 101 may generate an animation image in which the hair object changes from the first image 1010 to the second image 1020. As described above, the electronic device 101 may obtain multiple images captured between a first view and a second view between the two images and may generate an animation image using the first image 1010, the second image 1020, and the multiple images.

Figure 12A:
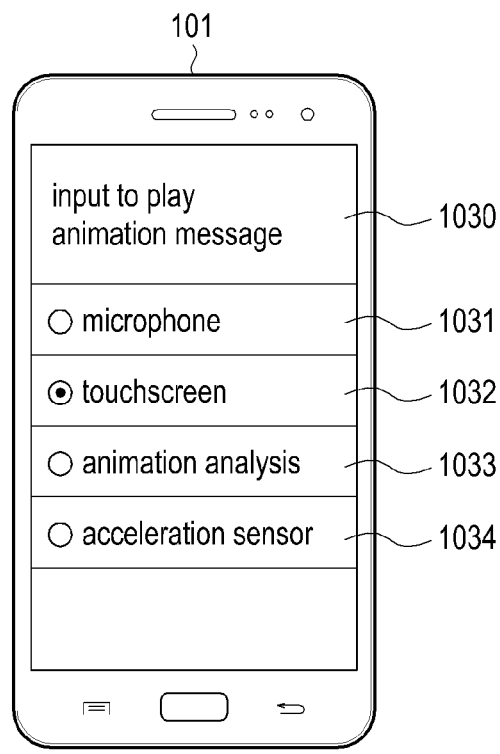
FIGS. 12A to 12E are views illustrating examples of generating and playing animation images according to one or more exemplary embodiments.
Figures 12B, 12C:
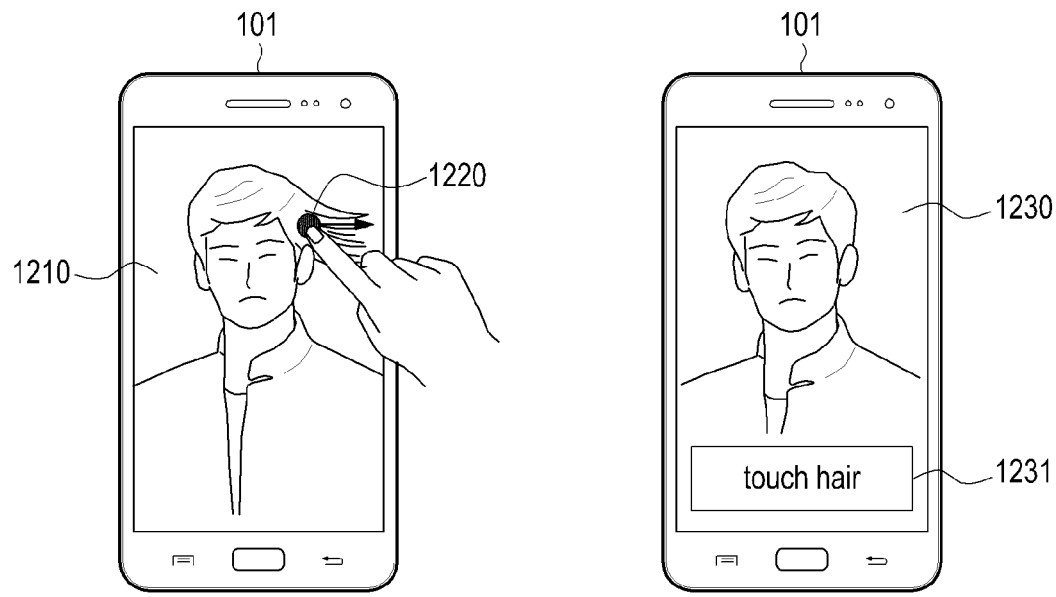

In operation 1130, the electronic device 101 may obtain an event corresponding to the first object through a touchscreen. According to an exemplary embodiment, the electronic device 101 may display a graphic user interface 1030 for obtaining an event as shown in FIG. 12A. For example, when the touchscreen is designated as a hardware to obtain the first event as shown in FIG. 12A, the electronic device 101 may activate the touchscreen included in the electronic device 101. The electronic device 101 may obtain touch information through the touchscreen and may set the obtained touch information to the first event. For example, as shown in FIG. 12B, the user of the electronic device 101 may input a touch 1220. Although the user directly touches the touchscreen as shown in FIG. 12B, this is merely an example. According to an exemplary embodiment, the electronic device 101 may obtain a hovering input that does not directly touch the touchscreen or an input of viewing a particular point on the touchscreen and may set the same as the first event.

The electronic device 101 may analyze the touch 1220 obtained from the touchscreen and may determine touch information including at least one of the position, type, direction, and size of the touch 1220. For example, the touch information may include the information that the direction of the touch 1220 is a right side direction. The electronic device 101 may set the first event to the information that the direction of the touch 1220 is the right side direction. Meanwhile, as the first event information, the "touchscreen" that is information on hardware that may obtain the first event and touch information that is content detected by the hardware may be stored.

In operation 1140, the electronic device 101 may store the obtained first event in association with the generated animation image. For example, the electronic device 101 may store information on the first event in metadata of the animation image. Or, the electronic device 101 may store information on the first event, with the information mapped to the animation image.

Figure 12D:
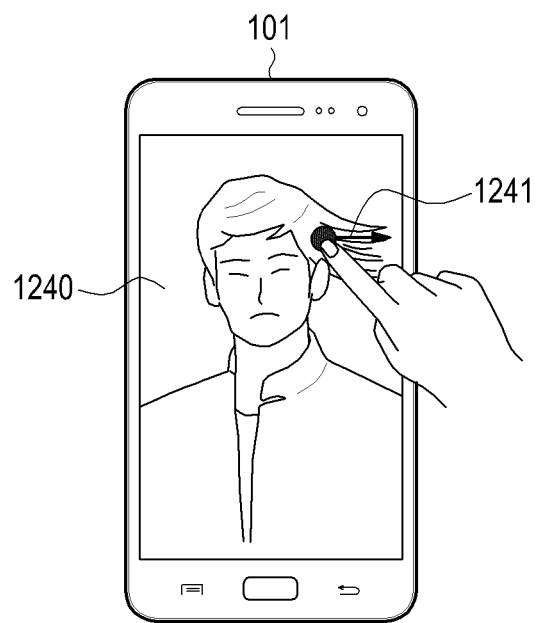

Referring to FIG. 11B, the electronic device 101 may obtain a touch input through a touchscreen in operation 1150. For example, as shown in FIGS. 12C and 12D, the electronic device 101 may obtain a touch 1241 through the touchscreen. The electronic device 101 may display the received animation image and may display the still image 1230 of the animation image. The electronic device 101 may identify hardware information for detecting the first event based on the information on the first event and may activate the touchscreen corresponding to the same. The touchscreen may obtain a touch input. The electronic device 101 may display an event information deriving object 1231 on the still image 1030 based on the first event information.

In operation 1160, the electronic device 101 may determine whether a first event corresponding to the first object is detected as a result of analysis of the touch. For example, as shown in FIG. 12D, the electronic device 101 may obtain the touch 1241 input by the user and may determine the touch information based on the result of analysis of the touch. As shown in FIG. 12D, the electronic device 101 may detect the information that the user has input a right-directional touch and may determine that the first event is detected.

When the first event is detected, the electronic device 101 may play an animation image associated with the first event in operation 1170. For example, as shown in FIG. 12D, the electronic device 101 may change a hair object of the still image 1230 to the hair object of the another image 1240 of the animation image and display the same. Although the electronic device 101 plays the animation image as if the electronic device 101 changes the still image 1230 to another image 1240 and displays the same as shown in FIGS. 12C and 12D, this is merely for ease of description. The electronic device 101 may play the animation image by sequentially changing the plurality of images included in the animation image from the still image 1230 and displaying the same. According to an exemplary embodiment, the electronic device 101 may play the animation only for the hair object storing the animation and may maintain the display of the remainder of the still image 1230.

Figure 12E:
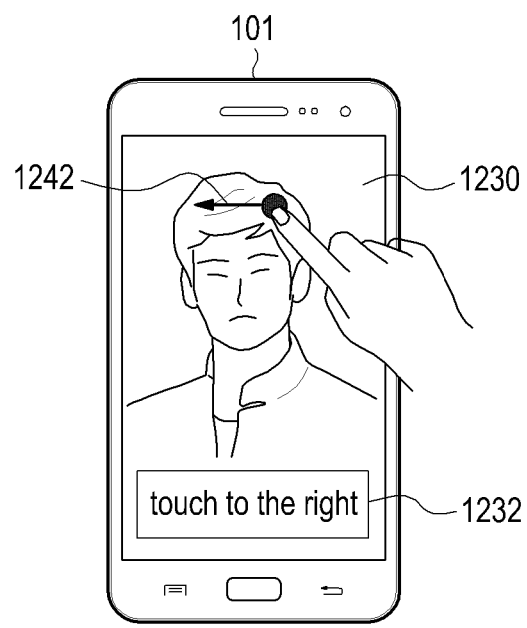

Meanwhile, as shown in FIG. 12E, the user may input a left-directional touch 1242. In this case, the electronic device 101 may analyze the touch 1242 to determine that the direction of the touch 1242 is a left side direction. The electronic device 101 may determine that the first event is not detected based on the information that the direction of the touch 1242 differs from the direction of the touch of the first event. The electronic device 101 may maintain the display of the still image 1230 and may display an object 1232 describing the first event.

Although the first event is described as the direction of a touch, this is merely an example. According to an exemplary embodiment, the electronic device may set the first event to at least one of a position, type, direction, and size of a touch input.

Figure 13A:
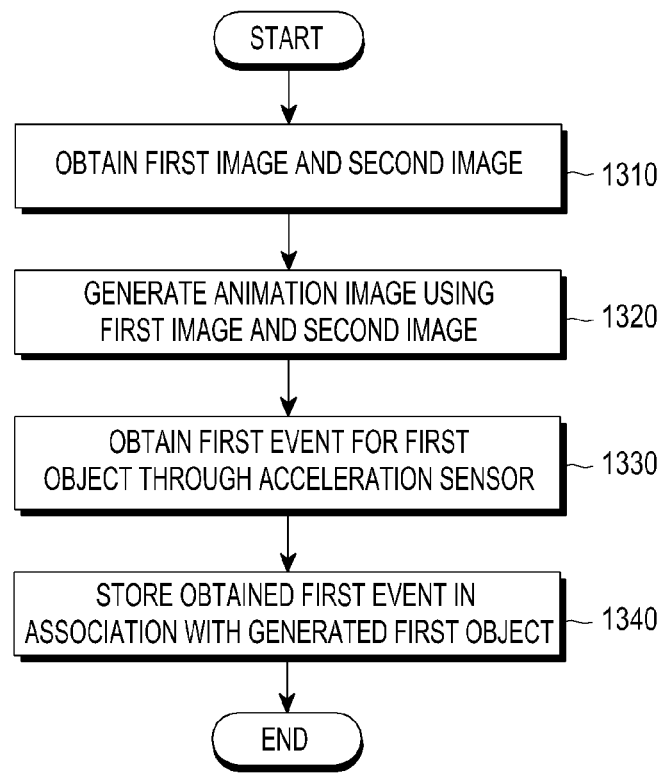
FIG. 13A is a flowchart illustrating a method of generating an animation image according to an exemplary embodiment.
Figure 13B:
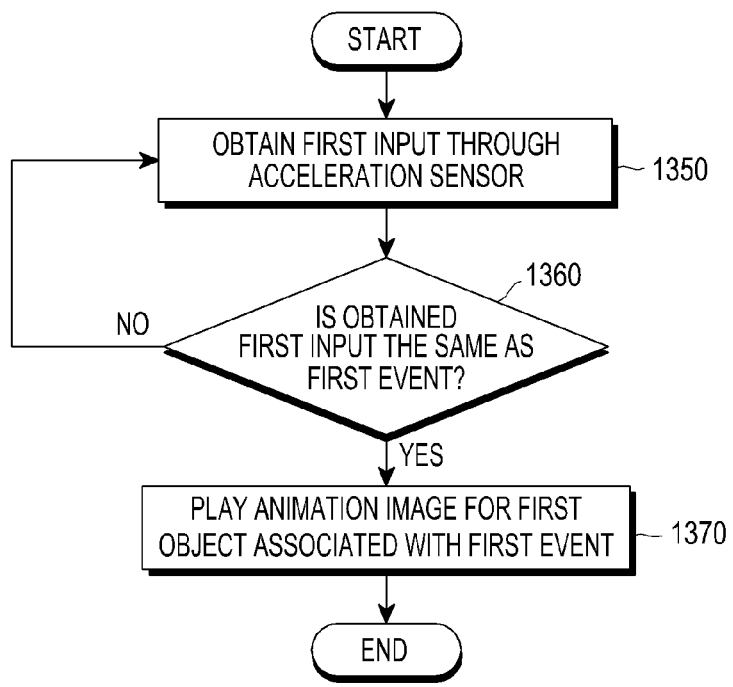
FIG. 13B is a flowchart illustrating a method of playing an animation image according to an exemplary embodiment.

FIG. 13A is a flowchart illustrating a method of generating an animation image according to an exemplary embodiment. The method may be executed the electronic device 101, and the electronic device may be controlled to execute the method. FIG. 13B is a flowchart illustrating a method of playing an animation image according to an exemplary embodiment. The method may be executed the electronic device 101, and the electronic device may be controlled to execute the method. One or more exemplary embodiments are described in detail with reference to FIGS. 13A and 13B along with FIGS. 14A to 14E. FIGS. 14A to 14E are views illustrating examples of generating and playing animation images according to one or more exemplary embodiments.

Referring to FIG. 13A, the electronic device 101 may obtain a first image and a second image in operation 1310. The electronic device 101 may capture an image of an object 1000 at a first view as shown in FIG. 10A to obtain a first image 1010 and may capture an image of an object 1000 at a second view as shown in FIG. 10B to obtain a second image 1000.

In operation 1320, the electronic device 101 may generate an animation image using the first image 1010 and the second image 1020. The electronic device 101 may generate an animation image changing from the first image 1010 to the second image 1020. As described above, the electronic device 101 may obtain multiple images captured between a first view and a second view between the two images and may generate an animation image using the first image 1010, the second image 1020, and the multiple images.

Figure 14A:
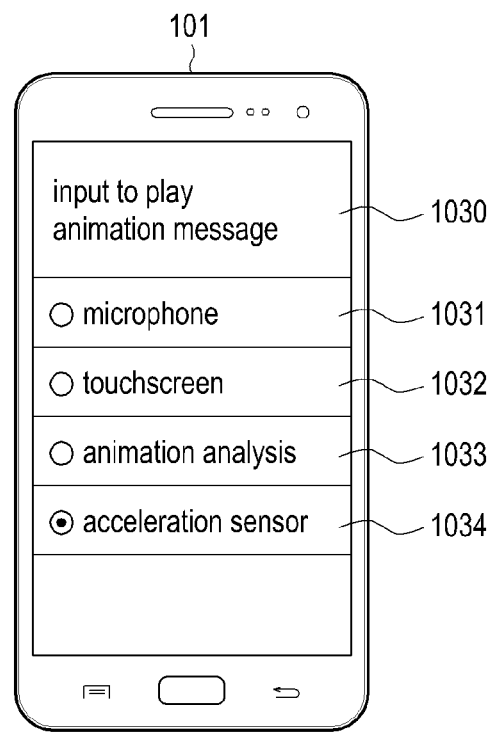
FIGS. 14A to 14E are views illustrating examples of generating and playing animation images according to one or more exemplary embodiments.
Figure 14B:
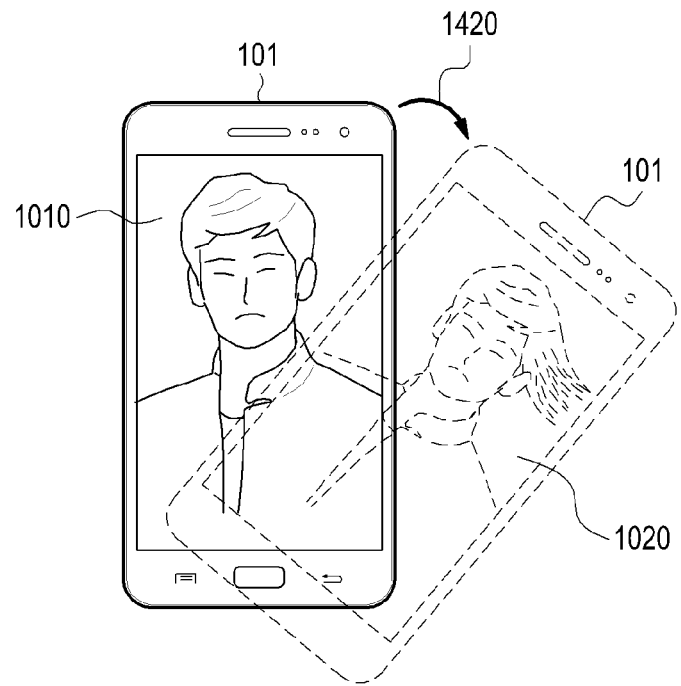

In operation 1330, the electronic device 101 may obtain an event corresponding to a first object, i.e., a hair object, through an acceleration sensor. According to an exemplary embodiment, the electronic device 101 may display a graphic user interface 1030 for obtaining an event as shown in FIG. 14A. For example, when the acceleration sensor is designated as a scheme to obtain the first event as shown in FIG. 14A, the electronic device 101 may activate the acceleration sensor included in the electronic device 101. The electronic device 101 may obtain movement information of the electronic device 101 through the acceleration sensor and may set the obtained acceleration information to the first event. For example, as shown in FIG. 14B, the user of the electronic device 101 may move (1420) the electronic device 101.

The electronic device 101 may analyze the movement 1420 obtained from the acceleration sensor and may determine the movement information including at least one of the direction, size, and speed of the movement 1420. For example, the movement information may include the information that the direction of the movement 1420 is a right side direction. The electronic device 101 may set the first event to the information that the direction of the movement 1420 is the right side direction. Meanwhile, as the first event information, the "acceleration sensor" that is information on hardware that may obtain the first event and movement information that is content detected by the hardware may be stored.

In operation 1340, the electronic device 101 may store the obtained first event in association with the animation image of the first object. For example, the electronic device 101 may store information on the first event in metadata of the animation image, or the electronic device 101 may store information on the first event, with the information mapped to the animation image.

Figure 14C:
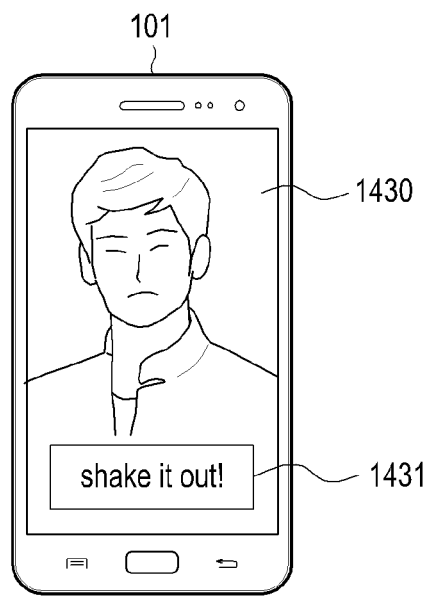
Figure 14D:
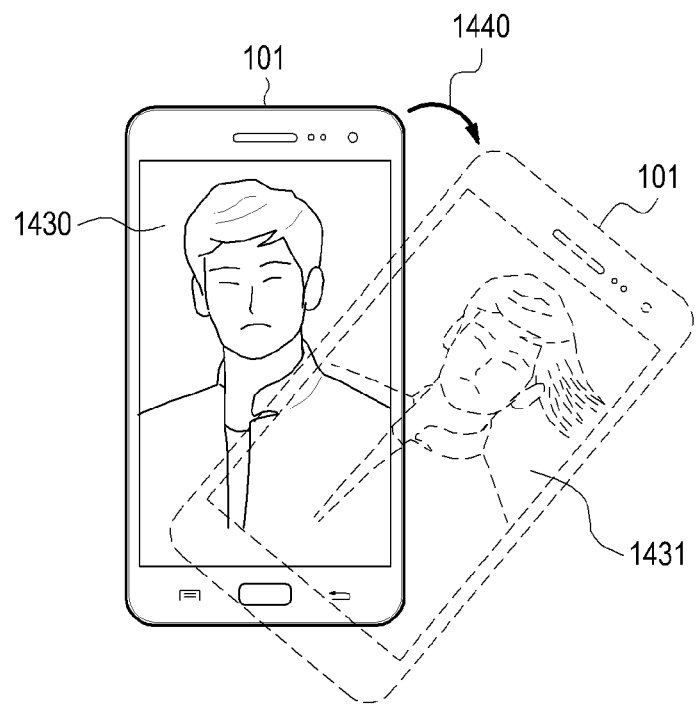

Referring to FIG. 13B, the electronic device 101 may detect a movement 1440 of the electronic device 101 through an acceleration sensor in operation 1350. For example, as shown in FIGS. 14C and 14D, the electronic device 101 may detect the movement 1440 of the electronic device 101 through the acceleration sensor. The electronic device 101 may display the received animation image and may display the still image 1430 of the animation image. The electronic device 101 may identify hardware information for detecting the first event based on the information on the first event and may activate the acceleration sensor corresponding to the same. The acceleration sensor may detect the movement 1440. The electronic device 101 may display an event information deriving object 1431 on the still image 1430 based on the first event information.

In operation 1360, the electronic device 101 may determine whether the first event corresponding to the first object, i.e., a hair object, is detected using a result of analysis of the movement. For example, as shown in FIG. 14D, the electronic device 101 may obtain the movement 1440 input by the user and may determine whether the first event corresponding to the first object is detected based on the movement information. As shown in FIG. 14D, the electronic device 101 may detect the information that the user has inputted a right-directional movement 1440 and may determine that the first event is detected.

When the first event is detected, the electronic device 101 may play an animation image associated with the first event in operation 1370. For example, as shown in FIG. 14D, the electronic device 101 may change the still image 1430 to another image 1431 of the animation image and display the same. Although the electronic device 101 plays the animation image as if the electronic device 101 changes the still image 1430 to another image 1431, as shown in FIGS. 14C and 14D, this is merely for ease of description. The electronic device 101 may play the animation image for the first object by sequentially changing the plurality of images included in the animation image from the still image 1430 and displaying the same. According to an exemplary embodiment, the electronic device 101 may play the animation only for the hair object and may maintain the display of the remainder of the still image 1430.

Figure 14E:
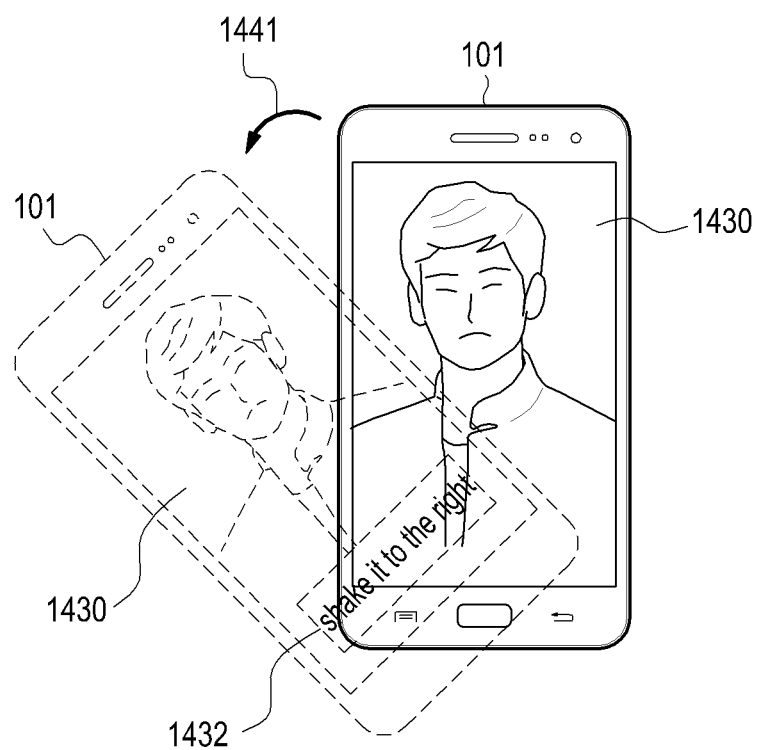

Meanwhile, as shown in FIG. 14E, the user may move the electronic device 101 in a left direction. In this case, the electronic device 101 may analyze the movement 1441 to determine that the direction of the movement 1441 is a left side direction. The electronic device 101 may determine that the first event is not detected based on the information that the direction of the movement 1441 differs from the direction of the first event. The electronic device 101 may maintain the display of the still image 1430 and may display an object 1432 describing the first event.

Although the first event may be a direction of a movement, this is merely an example. According to an exemplary embodiment, the electronic device 101 may set at least one of the direction, size, and speed of the movement to the first event.

Figure 15:
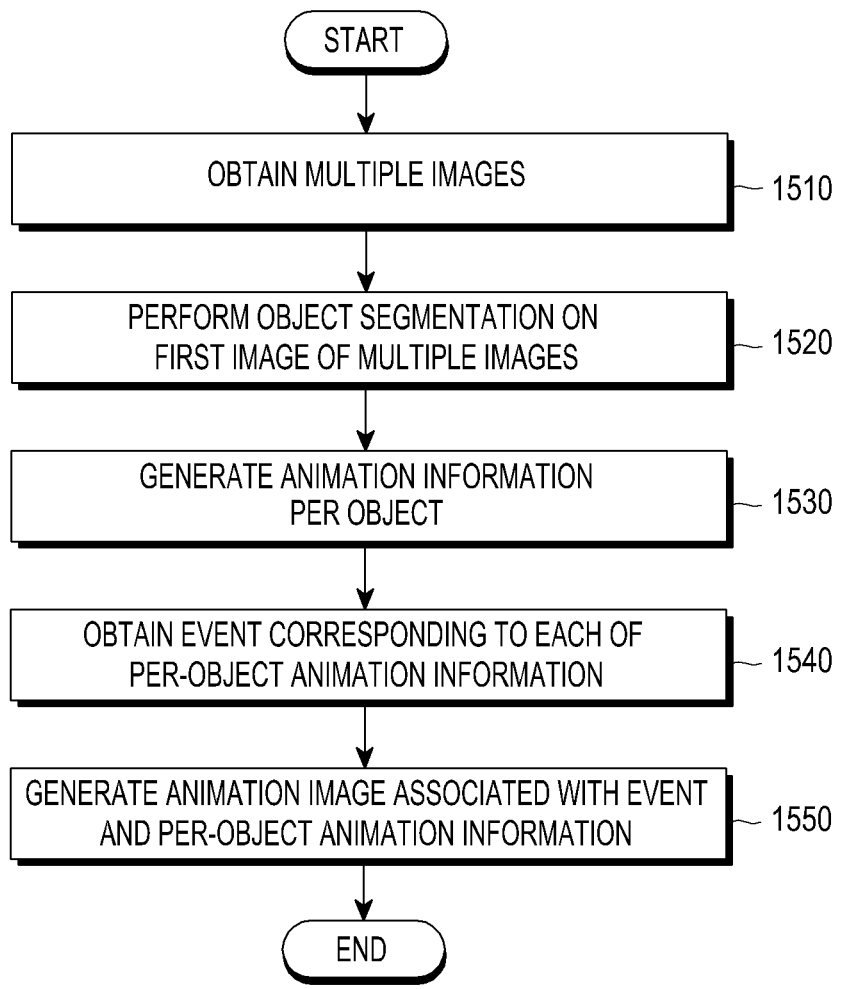
FIG. 15 is a flowchart illustrating a method of generating an animation image according to an exemplary embodiment.

FIG. 15 is a flowchart illustrating a method of generating an animation image according to an exemplary embodiment. The method may be executed the electronic device 101, and the electronic device may be controlled to execute the method.

In operation 1510, the electronic device 101 may obtain a plurality of images. For example, the electronic device 101 may obtain a first image and a second image including a first object and a second object.

In operation 1520, the electronic device 101 may perform object segmentation on the first image of the plurality of images. According to an exemplary embodiment, the electronic device 101 may obtain a depth map corresponding to the plurality of images and may perform the object segmentation based on depth information on the obtained depth map. Alternatively, the electronic device 101 may detect feature points such as edges or blobs from the plurality of images and may perform the object segmentation based on the detected feature points. Accordingly, the electronic device 101 may segment a first object and a second object from the first image and a first object and a second object from the second image.

In operation 1530, the electronic device 101 may generate animation information per object. The electronic device 101 may compare the position of the first object in the first image with the position of the first object in the second image and may generate first animation information including position change information. Further, the electronic device 101 may compare the position of the second object in the first image with the position of the second object in the second image and may generate second animation information including position change information.

In operation 1540, the electronic device 101 may obtain an event corresponding to each per-object animation information. The electronic device 101 may set an event, a condition for starting an animation, for each of the first object and the second object. As described above, according to an exemplary embodiment, the electronic device 101 may set an event based on an image analysis result or an external input. Accordingly, the electronic device 101 may set an event as shown in, for example, Table 1.

In operation 1550, the electronic device 101 may generate an animation image in which an event is associated with per-object animation information. The electronic device 101 may transmit the animation image to the second electronic device 102 or may play the animation image.

The second electronic device 102, when detecting an event, may play an animation of an object corresponding to the same. For example, the second electronic device 102 may obtain a preview image through the camera module, and the second electronic device 102 may analyze the preview image to detect a smiling face. The second electronic device 102 may play an animation for the first object corresponding to the detection of the smiling face and may maintain the display of the second object in the still image. The second electronic device 102 may detect a movement of the second electronic device 102 through an acceleration sensor, and the second electronic device 102 may detect motion information in a right direction. The second electronic device 102 may play an animation for the second object corresponding to the detection of the movement in the right direction and may maintain the display of the first object in the still image.

Figure 16A:
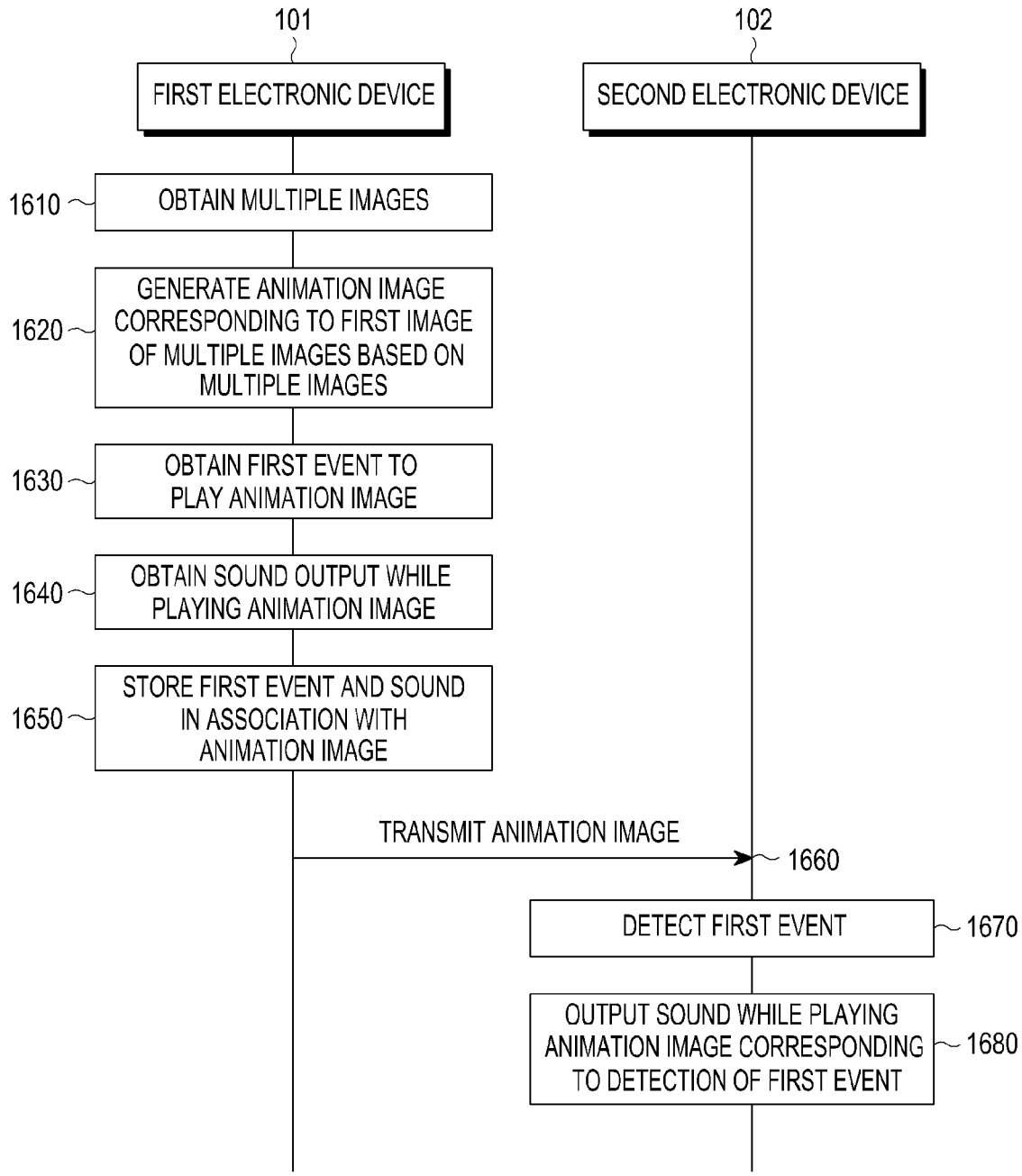
FIGS. 16A and 16B are flowcharts illustrating methods for controlling an electronic device according to one or more exemplary embodiments.
Figure 16B:
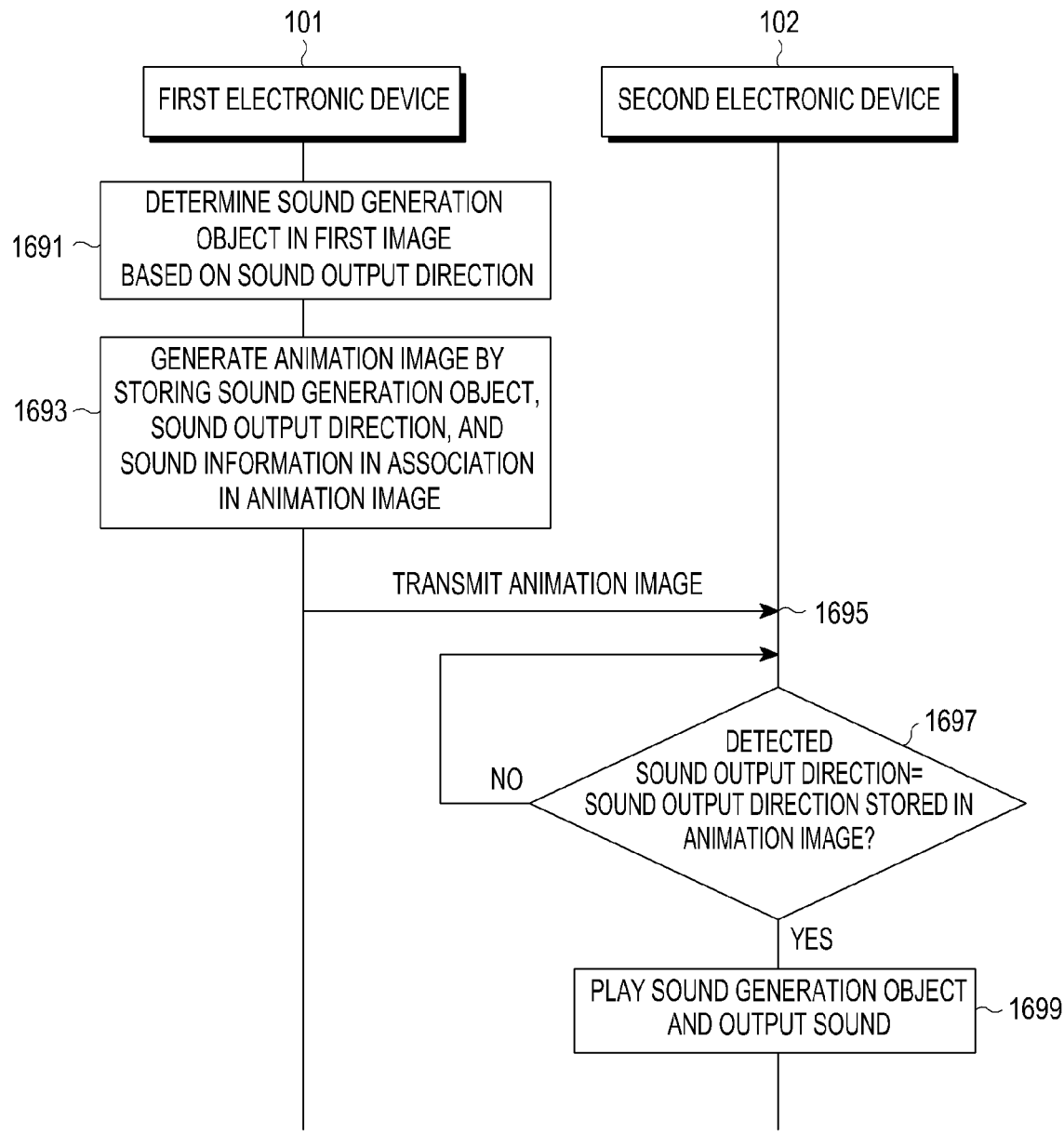

FIGS. 16A and 16B are flowcharts illustrating methods for controlling an electronic device according to one or more exemplary embodiments.

In operation 1610, the electronic device 101 may obtain a plurality of images. In operation 1620, the electronic device 101 may generate an animation image corresponding to a first image, i.e., a still image, of the plurality of images based on the plurality of images. In operation 1630, the electronic device 101 may obtain a first event to play the animation image.

In operation 1640, the electronic device 101 may obtain a sound output while the animation image is played. The electronic device 101 may obtain a sound generated from around the electronic device 101 while obtaining the plurality of images constituting the animation image. Alternatively, the electronic device 101 may obtain a sound before or after obtaining the plurality of images. Operation 1640 may be before, during, or after operation 1620, accordingly.

In operation 1650, the electronic device 101 may store the first event and the sound in association with the animation image. In operation 1660, the electronic device 101 may transmit the animation image to a second electronic device 102.

In operation 1670, the second electronic device 102 may detect a first event. As described above, the second electronic device 102 may activate hardware that may detect the first event and may analyze a signal from the hardware to detect the first event.

In operation 1680, the second electronic device 102 may output a sound while playing the animation image, corresponding to the detection of the first event. Accordingly, the user of the second electronic device 102 may view the animation image including the sound.

FIG. 16B is a flowchart illustrating a method for controlling an electronic device according to an exemplary embodiment.

In operation 1691, the electronic device 101 may determine a sound generation object in a first image based on a direction in which a sound is output. As described above, the electronic device 101 may include a plurality of microphones and may analyze sounds respectively obtained from the plurality of microphones to analyze a direction in which a sound is generated. For example, when the electronic device 101 determines that a direction in which a sound is generated is a first direction, the electronic device 101 may determine an object corresponding to the first direction in the still image and may determine the same as a sound generation object.

In operation 1693, the electronic device 101 may generate an animation image by storing the sound generation object, direction in which the sound is output, and sound information in association to each other. In operation 1695, the electronic device 101 may transmit the animation image to a second electronic device 102.

In operation 1697, the second electronic device 102 may detect an ambient sound to determine the direction in which the sound is generated and may determine whether the detected direction in which the sound is generated corresponds to the sound output direction stored in the animation image.

When the detected sound output direction corresponds to the output direction stored in the animation image, the second electronic device 102 may output the sound while playing the animation for the sound generation object in operation 1699.

Meanwhile, although the electronic device 101 transmits sound information to the second electronic device 102 as described above, this is merely an example. When playing an animation corresponding to a particular object, the electronic device 101 may also output a sound corresponding to the same.

Figure 17:
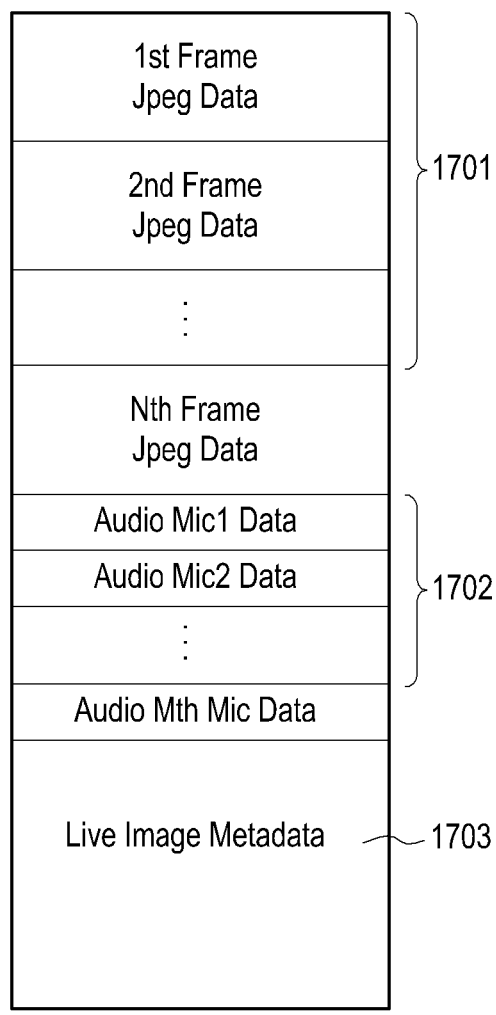
FIG. 17 is a view representing a data format of an animation image according to an exemplary embodiment.

FIG. 17 is a view representing a data format of an animation image according to an exemplary embodiment. According to an exemplary embodiment, each frame corresponding to the image data is stored as a compressed image data sequence 1701. Audio information 1702 corresponding to each of the microphones is also stored in at least a portion of the image metadata 1703. The live image metadata 1703 may store a first event per object, which is a condition for playing an animation image, that is, trigger information and other image parameter-related information. Further, the metadata 1703 may also store a depth map.

Figure 18:
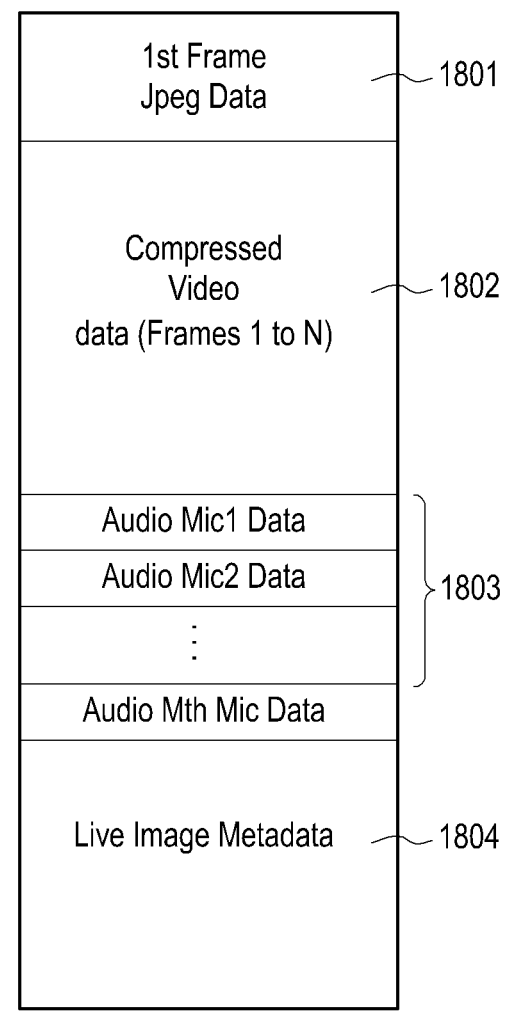
FIG. 18 is a view representing a file format of an animation image according to an exemplary embodiment.

FIG. 18 is a view representing a file format of an animation image according to an exemplary embodiment. According to an exemplary embodiment, the image data 1802 is compressed into video data using a standard video compression format, such as H.264 or moving picture experts group 4 (MPEG4), and is inserted into a container, such as an MPEG 4 part 14 (MP4) or a 3GPP file format (3GP). By contrast, a first frame 1801 of the sequence of frames is stored as compressed image data. This is a frame corresponding to the still image and might not be the first frame as described above. The audio information is stored as audio microphone data 1803. The number of audio files corresponds to the number of microphones present in the capturing device. The live image metadata 1804 may include metadata of an animation to be implemented in the image and a depth map. The image metadata 1804 may store the first event.

Figure 19:
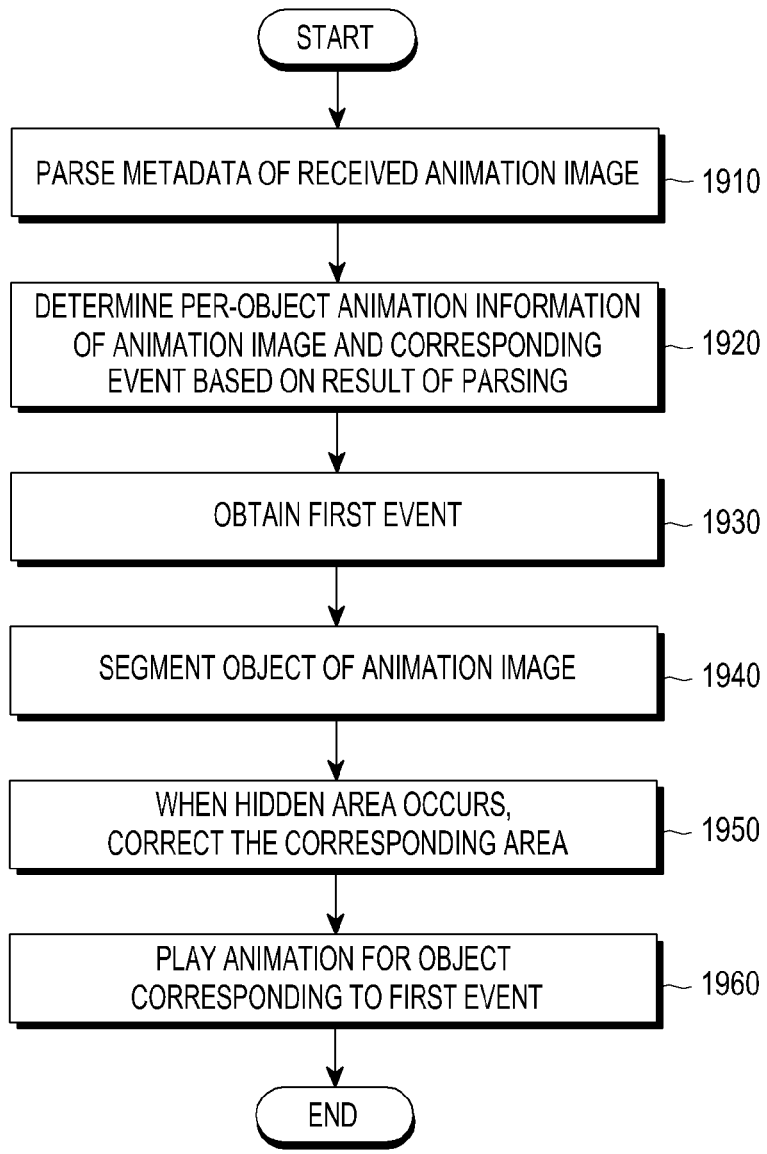
FIG. 19 is a flowchart illustrating an operation of an electronic device playing an animation image according to an exemplary embodiment.

FIG. 19 is a flowchart illustrating an operation of an electronic device playing an animation image according to an exemplary embodiment.

In operation 1910, the second electronic device 102 may parse metadata of a received animation image. For example, when receiving the animation image having the same format shown in FIG. 17 or 18, the second electronic device 102 may parse the metadata.

In operation 1920, the second electronic device 102 may determine animation information per object in the animation image and a corresponding event based on a result of the parsing. For example, the second electronic device 102 may determine a per-object corresponding event as shown in Table 1 based on the parsed result, and may determine animation information for each object. The second electronic device 102 may determine the animation information from image data.

In operation 1930, the second electronic device 102 may obtain a first event. The second electronic device 102 may identify an object corresponding to the first event. In operation 1940, the second electronic device 102 may segment the object of the animation image. In operation 1950, the second electronic device 102, when a hidden area occurs, may correct the corresponding area. In operation 1960, the second electronic device 102 may play an animation for the object corresponding to the first event.

Figure 20:
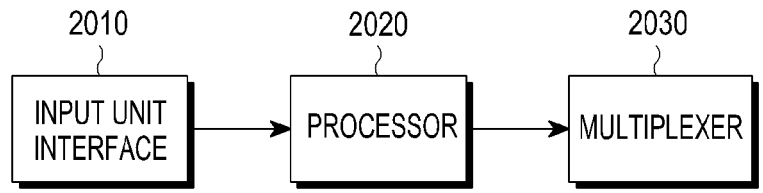
FIG. 20 is a block diagram of an electronic device configured to generate and record an animation corresponding to a still image according to an exemplary embodiment.

FIG. 20 is a block diagram of an electronic device configured to generate and record an animation corresponding to a still image according to an exemplary embodiment.

The electronic device includes an input/output interface 2010, a processor 2020, and a multiplexer 2030. The input/output interface 2010 may obtain images. The input/output interface 2010 may be implemented as, for example, a camera module or a communication module. Further, the input/output interface 2010 may include one or more input modules, such as burst shot modules, a depth estimation module for determining a depth map for the captured images, and a sound recorder module used to record sounds captured using microphones included in the capturing device. Similarly, the processor 2020 may include a registration and stabilization module and a trigger detection module that processes the captured frames to render images animated from the still image. The animated images are stored within image metadata and includes a sequence of frames corresponding to the still image, a depth map of the still image, and audio information corresponding to one or more objects present in the image. The image metadata may be generated by multiplexing the above-described data using the multiplexer 2030.

Figure 21:
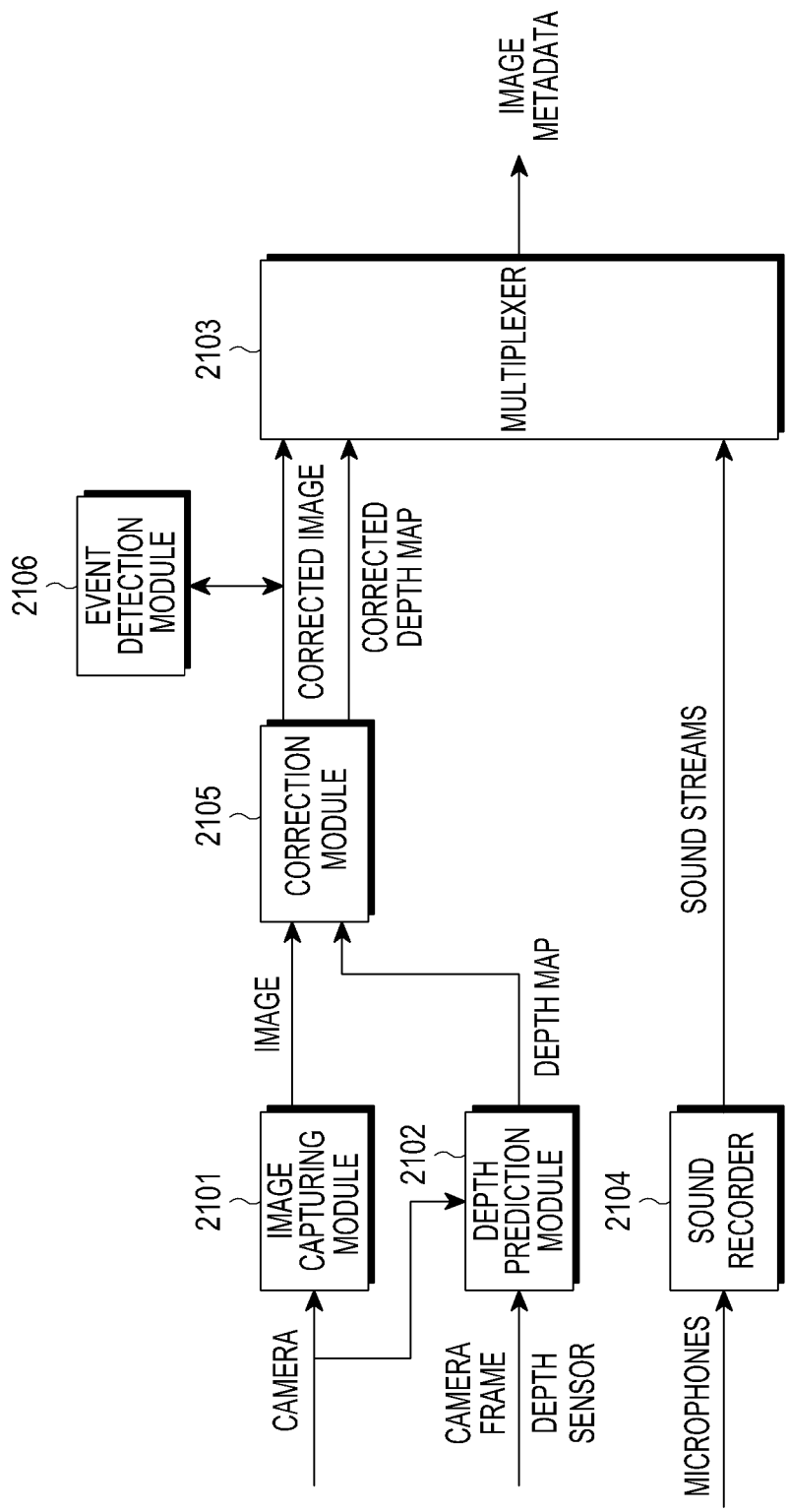
FIG. 21 is a block diagram of an electronic device configured to record an animation corresponding to a still image according to an exemplary embodiment.

FIG. 21 is a block diagram of an electronic device configured to record an animation corresponding to a still image according to an exemplary embodiment.

An image capturing module 2101 includes an image capturing device that may capture a sequence of frames. The sequence of frames may be multiple individual images or one or more video files. The sequence of frames is captured using at least one of a camera and a video camera. Further, the sequence of frames may be extracted from a video file that has been already captured or stored in the memory device. According to an exemplary embodiment, the image capturing device is connected with a burst shot module. The burst shot module internally generates a burst shot command. The burst shot command triggers a capture of the sequence of frames. The number of the images in the burst shot and a time gap in capturing between any two consecutive frames may be defined based on an animation period of the image. The number of the images in the burst shot and a time gap in capturing between any two consecutive frames may be previously defined.

A depth prediction module 2102 may determine a depth map of the captured images. The depth map information may be derived from the captured sequence of frames. The depth prediction module 2102 may be connected with the burst shot module. The depth prediction module 2102 may compute a depth map corresponding to each image in the burst shot. The depth map may be determined using a sequence of frames captured using various schemes for detecting or predicting a depth, such as, as non-limiting examples, time-of-flight based depth sensors, a stereo camera, infrared (IR) projection, focus bracketing, and the camera.

The time-of-flight (TOF) based depth sensors each include a common TOF sensor, a modulated light source, such as a laser or a light emitting diode (LED), an array of pixels each capable of detecting the phase of incident light, and a common optical system focusing the light to the sensor. The light is provided as a modulation envelope obtained by quickly turning on and off the light source. Distance/depth measurement may be achieved by measuring the phase of the modulation envelope of the light received by the pixel array.

The stereo camera computes a depth map based on a difference between two images captured at the same time from two different camera sensors. A movement of objects on a scene over stereo images is inversely proportional to the depth. The depth is computed based on stereo matching that is the process of capturing two or more images, detecting matching pixels from the images, and converting their 2D positions to 3D depths to estimate a 3D model of the scene.

By the IR projection scheme, a known structured light pattern may be projected on the scene, and depth may be inferred based on a change in the pattern.

Focus bracketing obtains a depth by capturing multiple images of a scene at different focal lengths. A depth map is computed based on changes in sharpness over the images.

The electronic device may also estimate depth information from visual camera frame data using a segmentation algorithm using color, texture, shape, or other image-related attributes. According to an exemplary embodiment, the depth map is independently obtained per frame. According to an exemplary embodiment, the depth map is computed for the first frame. Further, the depth map for the remaining frames may also be obtained by tracking the depth map for the first frame over the sequence of frames, such as, as non-limiting examples, shape/silhouette/blob tracking and a particle filter.

The microphones and sound recorder 2104 may be other types of input modules used to record audio information corresponding to one or more objects present in the image.

The captured frames and depth map are provided to a correction module 2105. According to an exemplary embodiment, each still image and depth map is registered in the first frame to correct alignment errors. Further, a correction algorithm may be executed to correct an irregular camera movement due to a hand shake. The stabilization algorithm may include optical image stabilization, software-based digital image stabilization, or a combination of the optical image stabilization and the software-based digital image stabilization. According to an exemplary embodiment, the correction module 2105 detects a conversion from a previous frame to a current frame using feature detection and Lucas-Kanade light flow for a plurality of or all of the frames. The conversion includes three parameters such as dx (movement in an x direction), dy (movement in a y direction), and da (angle). The conversion parameters are accumulated to obtain the trajectory of x, y, and angle in each frame. The trajectory is smoothed using a Kalman filter. The corrected conversion applies to the frames. This stabilizes the images. When the frames are stabilized, registration is performed. While the frames are registered, conversion parameters for all of the frames are detected using a feature extraction and light flow. Thereafter, all of the frames are turned back to the first frame using the components of the conversion parameters.

The processor includes an event detection module 2106. The event detection module 2106 analyzes the images to identify the occurrence of the event. Triggers may include at least one of a touch, a stare, a talk, a shake, and a gesture. The event may be, as non-limiting examples, the number of depth layers, smiles, or eye blinks. According to an exemplary embodiment, the images are analyzed for the presence of a face/smile. For the given image, facial features and a direction are computed with the active appearance model (AAM). A mesh is defined based on AAM points, and other facial features, such as a nose, lip, and mouth, are identified. The presence of a smile is identified using the AAM points. The information is stored in metadata of the file. The registered images and registered depth map are provided to the multiplexer 2030. The multiplexer 2030 multiplexes the image, depth map, and sound streams (from multiple microphones) into image metadata. Meanwhile, the event detection module 2106 may be implemented not in image analysis, but using various types of hardware such as a microphone, proximity sensor, or motion information sensor. The processor may also detect an event based on a signal from the hardware.

Figure 22:
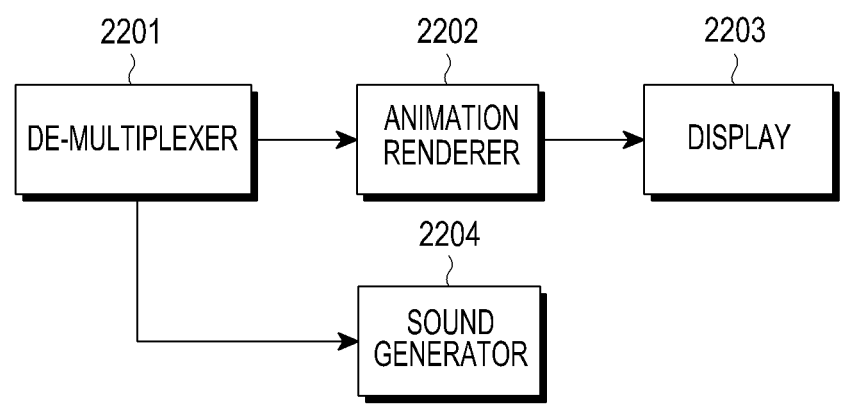
FIG. 22 is a block diagram of an electronic device configured to play an animation recorded in at least one object of a still image corresponding to an animation image according to an exemplary embodiment.

FIG. 22 is a block diagram of an electronic device configured to play an animation recorded in at least one object of a still image corresponding to an animation image according to an exemplary embodiment.

According to an exemplary embodiment, the electronic device includes a demultiplexer 2201, an animation renderer 2202, e.g., an animation rendering module, a display 2203, and a sound generator 2204, e.g., a speaker or a sound generation module. The demultiplexer 2201 may demultiplex a composite file generated by the multiplexer. For example, when an animation image having the same format shown in FIGS. 15 and 16 is received, the demultiplexer 2201 may demultiplex the animation image into a plurality of areas. The sound streams demultiplexed from the animation image may be transmitted to the sound generator 2204. The images and depth map are provided to the animation renderer 2202 re-generating the animation in the image corresponding to the detection of an event. The display 2203 may play the animation rendered by the animation renderer 2202.

Figure 23:
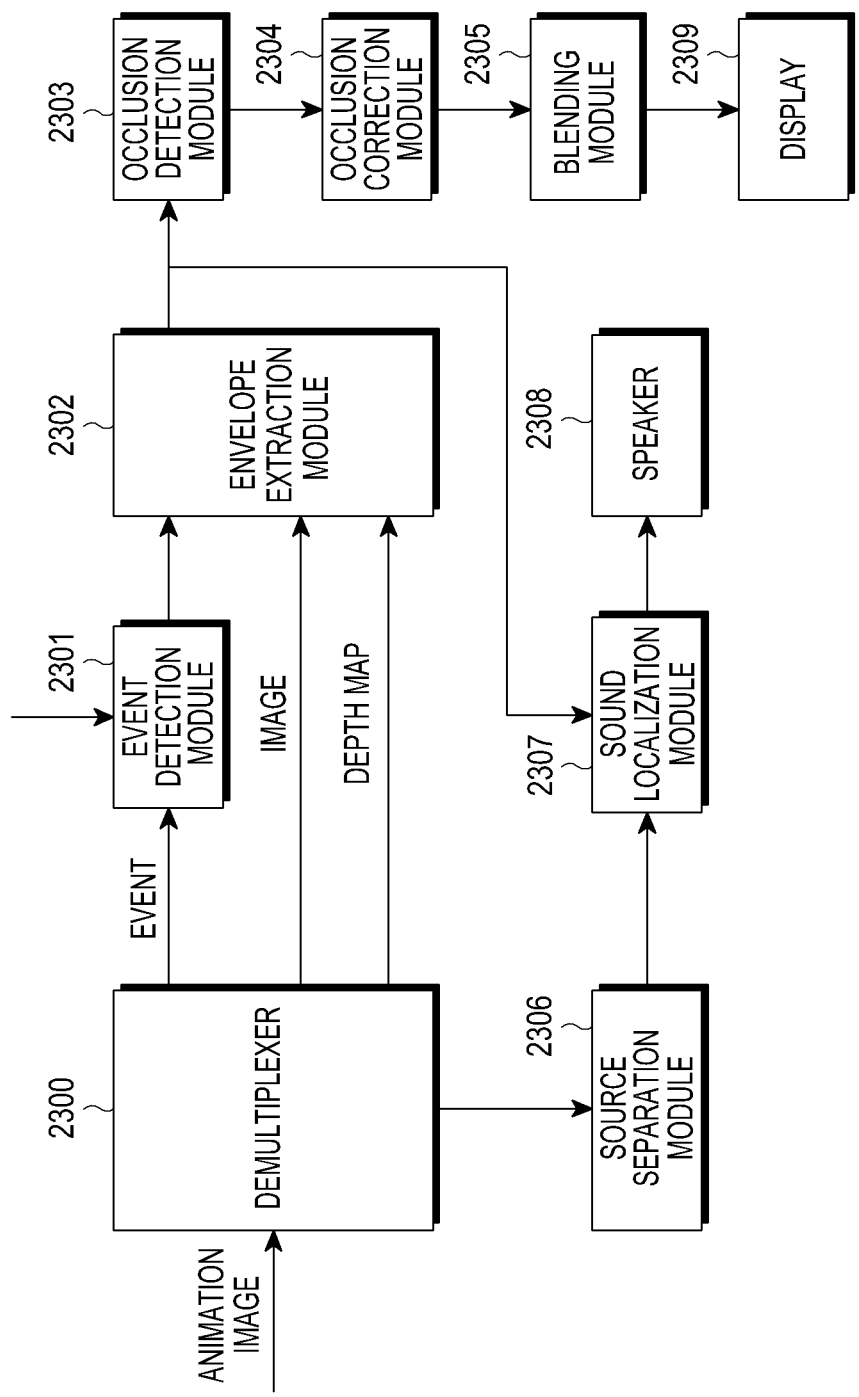
FIG. 23 is a block diagram of an electronic device configured to play an animation image according to an exemplary embodiment.

FIG. 23 is a block diagram of an electronic device configured to play an animation image according to an exemplary embodiment.

The demultiplexer 2300 parses the image metadata and extracts the image, depth map and sound streams. The sound stream is transmitted to a source separation module 2306. By contrast, the image and depth map are transmitted to an envelope extraction module 2302. The event corresponding to the animation is extracted by the demultiplexer 2300. The event is provided to the event detection module 2301. The event detection module 2301 may activate hardware corresponding to the event and may detect an event based on a signal from the activated hardware. Information on the event may be transmitted to the envelope extraction module 2302. The information on the event may include, for example, a coordinate of the event. The coordinate of the event may be a coordinate of a touch point on the image touched by the user.

According to an exemplary embodiment, when the still image includes a figure's smile, this information is stored in the file at the time of capturing the still image. When the image is viewed, this information is detected and is provided to the user as an indication of the presence of the smile (e.g., a smile icon). The user interaction may be "when the user smiles, an animation image smiles again." The envelope extraction module 2302 receives the coordinate of the event for the event detection module 2301 and performs segmentation on the desired object from the depth map. A scheme useful for the depth-based segmentation is used for segmentation of images. The segmentation of images helps to identify the foreground objects and background objects. This module also analyzes all of the frames that are part of the segmented depth and the captured file to extract an envelope of the moving object. The identified object area is transmitted to a sound localization module 2307. An occlusion detection module 2303 identifies the presence of occlusion based on the segmented images. The occlusion is an overlap between two distinct objects in the image. An occlusion correction module 2304 removes the hidden area and compensates for the hidden area based on information present in adjacent frames of the sequence of frames. A blending module 2305 copies an area corresponding to the segmented images using a depth map from each frame and adds the same to the first frame of the sequence of frames. The added boundary areas are blended to insure a seamless transition, generating a composite image. According to an exemplary embodiment, blending schemes, such as alpha blending, Laplacian blending, Poisson blending, etc., are used to generate the composite image. Each composite image is rendered on a display 2309 to reproduce the same operation of the object that was present upon capture.

The source separation module 2306 filters each sound source together with direction information from multiple sound streams recorded using multiple microphones. This may be achieved by analysis based on interaural time differences (ITDs), interaural intensity differences (IIDs), and interaural phase differences (IPDs). The sound localization module 2307 localizes the sound sources based on the position of the extracted envelope. According to an exemplary embodiment, the localization of sound means identifying a sound spread using the sound direction information. When there is a sound corresponding to the user touch object, the corresponding sound is played using a speaker 2308. One or more of the above modules may be implemented as hardware, software, or a combination of hardware and software, such as a general or special purpose processor and computer readable code.

According to an exemplary embodiment, a method for controlling an electronic device may include obtaining a plurality of images; displaying a first image of the plurality of images; detecting a first event set to start to play an animation image for a first object of the first image; and playing the animation image for the first object using the plurality of images.

According to an exemplary embodiment, the method may further include maintaining the display of the first image for objects other than the first object.

According to an exemplary embodiment, the method may further include segmenting the first object in each of the plurality of images. Segmenting the first object in each of the plurality of images may include: obtaining a depth map for each of the plurality of images; and segmenting the first object in each of the plurality of images based on the depth map for each of the plurality of images. Segmenting the first object in each of the plurality of images may include: obtaining image information for each of the plurality of images; and segmenting the first object in each of the plurality of images based on the image information for each of the plurality of images.

According to an exemplary embodiment, detecting the first event may include detecting a touch on an area corresponding to the first object of the displayed animation image or detecting a user's view on an area corresponding to the first object of the displayed animation image.

According to an exemplary embodiment, detecting the first event may include detecting an object having a movement exceeding a threshold of the first image.

According to an exemplary embodiment, detecting the first event may include detecting at least one of a sound set to the first event, motion information set to the first event, and an image analysis result set to the first event.

According to an exemplary embodiment, the method may further include: correcting a hidden area of the plurality of images; and playing an animation for the first object using the plurality of corrected images.

According to an exemplary embodiment, the method may further include: obtaining a sound while obtaining the plurality of images; and outputting the obtained sound while playing an animation for the first object.

According to an exemplary embodiment, a method for controlling an electronic device may include: obtaining a plurality of images; generating an animation image corresponding to a first object of a first image of the plurality of images based on the plurality of images; obtaining a first event to play the animation image corresponding to the first object; and storing the first event in association with the animation image.

According to an exemplary embodiment, obtaining the first event may include: obtaining the first event using at least one of the plurality of images.

According to an exemplary embodiment, obtaining the first event may include obtaining the first event based on a detected input.

According to an exemplary embodiment, the method may further include: obtaining a sound around the electronic device; and storing the obtained sound in association with the animation image.

According to an exemplary embodiment, the method may further include: obtaining information for segmenting at least one of the plurality of images; and storing the information for the segmenting in association with the animation image.

According to an exemplary embodiment, there is provided a storage medium storing instructions configured to be executed by at least one processor to enable the processor to perform at least one operation, wherein the at least one operation may include: obtaining a plurality of images; displaying a first image of the plurality of images; detecting a first event set to start to play an animation image for a first object of the first image; and playing the animation image for the first object using the plurality of images.

The exemplary embodiments disclosed herein are for description purposes and to provide a greater understanding of one or more exemplary embodiments, and do not limit the scope of the present disclosure. The scope of the present disclosure should be interpreted as including all changes, replacements, equivalents, and various embodiments based on the technical spirit of the present disclosure, as would be understood by one skilled in the art.

What is claimed is:

1. A method of playing an animation, the method comprising:
storing, via an electronic device, a plurality of images sequentially captured during a period, each of the plurality of images including an object and a remaining area excluding the object in each of the plurality of images;
displaying, via the electronic device, a first image which is one of the plurality of images stored in the electronic device;
detecting, via the electronic device, an event to play the animation for the object while the first image is displayed; and
in response to detecting the event, playing, via the electronic device, the animation for the object based on the object included in the plurality of images, such that the object is animated and the remaining area remains constant as at least one image among the plurality of images while the object is animated.

2. The method of claim 1, further comprising segmenting the object in each of the plurality of images.

3. The method of claim 2, wherein the segmenting comprises:
obtaining a respective depth map for each of the plurality of images; and
segmenting the object in each of the plurality of images based on the respective depth maps.

4. The method of claim 2, wherein the segmenting comprises:
obtaining respective image information for each of the plurality of images; and
segmenting the object in each of the plurality of images based on the respective image information.

5. The method of claim 1, wherein the detecting comprises detecting at least one of a touch on an area corresponding to the object of the first image, a user's view on the area corresponding to the object of the first image, and a sound and a motion of the electronic device to play the animation as a user interaction.

6. The method of claim 1, wherein the event comprises at least one of a touch, a trigger sound, motion information, and an image analysis result.

7. The method of claim 1, wherein the playing the animation for the object comprises
correcting a hidden area in at least one of the plurality of images if the hidden area occurs in playing the animation based on the object segmented from the plurality of images; and
playing the animation for the object using the plurality of images including the at least one of the plurality of images having the corrected hidden area.

8. The method of claim 1, further comprising:
obtaining a sound while capturing the plurality of images during the period; and
outputting the obtained sound while playing the animation for the object.

9. The method of claim 1, wherein the detecting the event comprises determining, via the electronic device, that the object has a movement exceeding a threshold through the plurality of images or the object is indicated by a user.

10. The method of claim 1, wherein the event is predetermined corresponding to the object, and the event is at least one of a touch on the object, a trigger sound from a user received by the electronic device, a motion of the electronic device, a face recognition of the user from an image captured by the electronic device and a viewing point of the user on the object.

11. An electronic device, comprising:
a display;
a processor electrically connected to the display; and
a memory electrically connected to the processor, wherein the memory stores instructions that, when executed by the processor, instruct the processor to:
store, into the memory, a plurality of images sequentially captured during a period, each of the plurality of images including an object and a remaining area excluding the object in each of the plurality of images,
control the display to display a first image of the plurality of images stored in the electronic device,
detect an event, and
control the display to, in response to detecting the event, play an animation for the object based on the object included in the plurality of images, such that the object is animated and the remaining area remains constant as at least one image among the plurality of images while the object is animated.

12. The electronic device of claim 11, wherein the memory stores further instructions that, when executed by the processor, instruct the processor to perform segmentation on the object in each of the plurality of images.

13. The electronic device of claim 12, wherein the memory stores further instructions that, when executed by the processor, instruct the processor to:
obtain a respective depth map for each of the plurality of images, and
perform segmentation on the object in each of the plurality of images based on the respective depth maps.

14. The electronic device of claim 12, wherein the memory stores further instructions that, when executed by the processor, instruct the processor to:
obtain respective image information for each of the plurality of images, and
perform segmentation on the object in each of the plurality of images based on the respective the image information.

15. The electronic device of claim 11, wherein the memory stores further instructions that, when executed by the processor, instruct the processor to detect the event by detecting at least one of a touch on an area corresponding to the object of the first image, and a user's view on the area corresponding to the object of the first image.

16. The electronic device of claim 11, wherein the event comprises at least one of a touch, a trigger sound, motion information, and an image analysis result.

17. The electronic device of claim 11, wherein the memory stores further instructions that, when executed by the processor, instruct the processor to:
correct a hidden area in at least one of the plurality of images if the hidden area occurs in playing the animation based on the object segmented from the plurality of images, and
control the display to play the animation for the object using the plurality of images including the at least one of the plurality of images having the corrected hidden area.

18. The electronic device of claim 11, wherein the memory stores further instructions that, when executed by the processor, instruct the processor to:
obtain a sound while capturing the plurality of images during the period, and
output the obtained sound while playing the animation for the object.

19. The electronic device of claim 11, wherein the memory stores further instructions that, when executed by the processor, instruct the processor to determine that the object has a movement exceeding a threshold through the plurality of images or the object is indicated by a user.

20. The electronic device of claim 11, wherein the event is predetermined corresponding to the object, and the event is at least one of a touch on the object, a trigger sound from a user received by the electronic device, a motion of the electronic device, a face recognition of the user from an image captured by the electronic device and a viewing point of the user on the object.

* * * * *